(12) United States Patent
Nadal et al.

(10) Patent No.: US 10,855,505 B2
(45) Date of Patent: Dec. 1, 2020

(54) DIGITAL ENCODER AND METHOD OF ENCODING

(71) Applicant: INSTITUT MINES-TELECOM / TELECOM BRETAGNE, Brest (FR)

(72) Inventors: Jérémy Nadal, Brest (FR); Charbel Abdel Nour, Brest (FR); Amer Baghdadi, Brest (FR)

(73) Assignee: INSTITUT MINES-TELECOM / TELECOM BRETAGNE, Brest (FR)

( * ) Notice: Subject to any disclaimer, the term of this patent is extended or adjusted under 35 U.S.C. 154(b) by 24 days.

(21) Appl. No.: 15/673,902

(22) Filed: Aug. 10, 2017

(65) Prior Publication Data

US 2018/0048510 A1    Feb. 15, 2018

(30) Foreign Application Priority Data

Aug. 12, 2016  (EP) .................................... 16306056

(51) Int. Cl.
*H04L 27/26* (2006.01)

(52) U.S. Cl.
CPC ........ *H04L 27/2628* (2013.01); *H04L 27/264* (2013.01); *H04L 27/2643* (2013.01); *H04L 27/2607* (2013.01)

(58) Field of Classification Search
CPC ............... H04L 27/2628; H04L 5/0007; H04L 27/2602; H04L 27/2607; H04L 1/0026; H04L 27/2605; H04L 27/2627; H04L 27/2601; H04L 1/0668; H04L 27/2634; H04L 43/028; H04L 1/0625; H04L 27/04

(Continued)

(56) References Cited

U.S. PATENT DOCUMENTS

| 8,036,286 | B2 * | 10/2011 | Lee ...................... H04B 7/0682 |
|           |      |         | 375/260 |
| 8,462,865 | B2 * | 6/2013  | Cho ...................... H04L 1/0061 |
|           |      |         | 375/260 |

(Continued)

OTHER PUBLICATIONS

European Search Report for 16306056.9 dated Feb. 16, 2017.

(Continued)

*Primary Examiner* — Qutbuddin Ghulamali
(74) *Attorney, Agent, or Firm* — Meagher Emanuel Laks Goldberg & Liao, LLP

(57) ABSTRACT

An encoder architecture for UF-OFDM is provided, in which samples are first processed sub-band wise, and then resorted for sub-carrier-wise processing. The sub-carrier processing may comprise separate processing for the two extremity parts of the base band signal corresponding to the transient state of the UF-OFDM data stream and for a core part of the base band signal corresponding to the non-transient state of the UF-OFDM data stream, and then concatenated to obtain a UF-OFDM data stream. In certain embodiments a first extremity part of the base band signal corresponding to the transient state of the UF-OFDM data stream is calculated directly, and the other extremity part inferred from the core part and the first extremity part. The core and extremity part processors may be implemented with filters adapted to multiply each sample by a respective filter coefficient. Modifying these coefficients can introduce a frequency shift or convert the encoder for OFDM encoding.

17 Claims, 9 Drawing Sheets

(58) Field of Classification Search
USPC .............................. 365/260, 267, 259
See application file for complete search history.

(56) References Cited

U.S. PATENT DOCUMENTS

| | | | | |
|---|---|---|---|---|
| 2007/0206559 A1* | 9/2007 | Cho | ............... | H04L 5/0037 370/344 |
| 2010/0074349 A1* | 3/2010 | Hyllander | ........... | H04L 27/2647 375/260 |
| 2011/0274123 A1* | 11/2011 | Hammarwall | ........ | H04L 1/0079 370/479 |
| 2016/0261448 A1* | 9/2016 | Muhammad | .......... | H04L 27/265 |

OTHER PUBLICATIONS

Matthe Maximilian et al: "A Reduced Complexity Time-Domain Transmitter for UF-OFDM", 2816 IEEE 83rd Vehicular Technology Conference (VTC Spring), IEEE, May 15, 2016 (May 15, 2016), pp. 1-5.

V. Vakilian, T. Wild, F. Schaich, S. ten Brink and J. F. Frigon, in "Universal-filtered multi-carrier technique for wireless systems beyond LTE," 2013 IEEE Globecom Workshops (GC Wkshps), Atlanta, GA, 2013, pp. 223-228.

F. Schaich and T. Wild, in "Relaxed synchronization support of universal filtered multi-carrier including autonomous timing advance," 2014 11th International Symposium on Wireless Communications Systems (ISWCS), Barcelona, 2014, pp. 203-208.

H. D. Helms in "Digital filters with equiripple or minimax responses," IEEE Transactions on Audio and Electroacoustics, vol. 19, pp. 87-94, Mar. 1971.

T. Wild and F. Schaich, in "A Reduced Complexity Transmitter for UFOFDM," 2015 IEEE 81st Vehicular Technology Conference (VTC Spring), Glasgow, 2015, pp. 1-6.

* cited by examiner

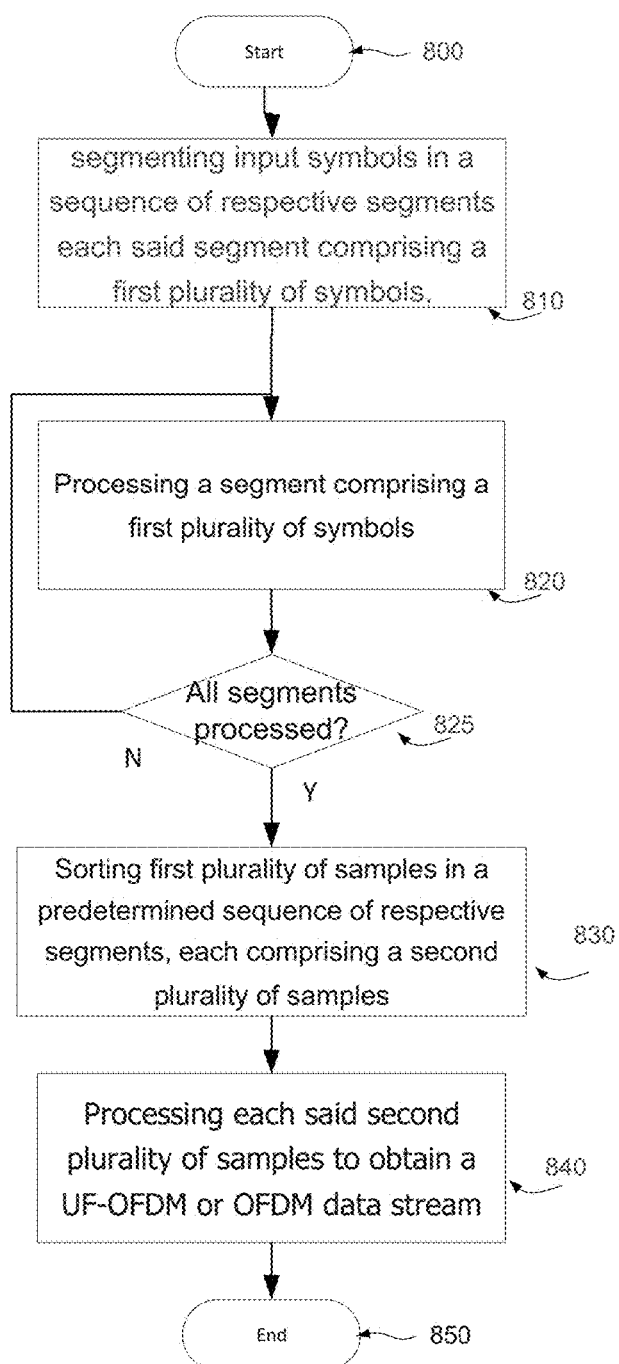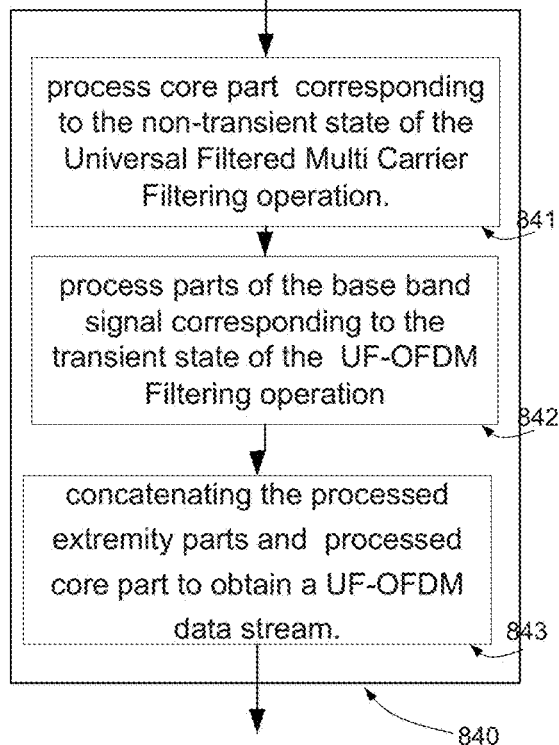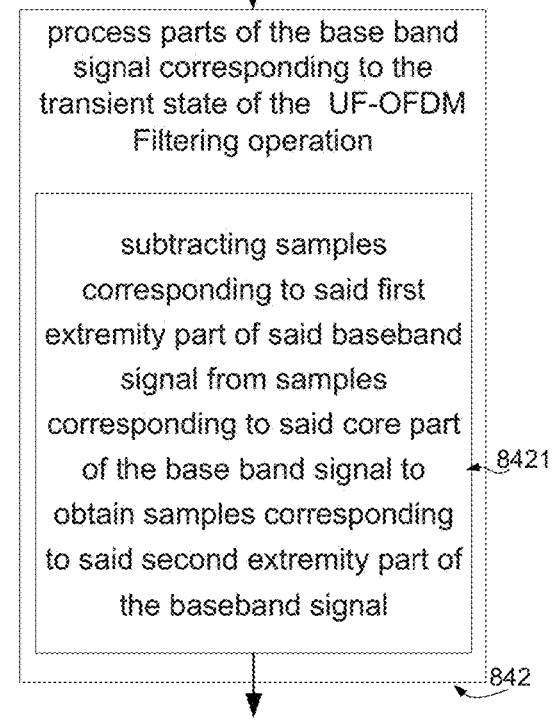

DIGITAL ENCODER AND METHOD OF ENCODING

FIELD OF THE INVENTION

The present invention relates to a Digital Encoder and method of encoding, and more particularly to an encoder for multicarrier waveform based encoding schemes such as Universal filtered Orthogonal frequency division multiplexing (UF-OFDM) encoding as defined hereafter.

BACKGROUND OF THE INVENTION

With the proliferation of internet applications, it is expected that the mobile traffic volume supported by future communication networks will be almost 500 times larger than today's by 2020. To respond favourably to such constraints while keeping a high level of user quality of experience, system capacity and user fairness should be largely improved for the future 5th generation (5G) mobile communication systems.

Universal Filtered Orthogonal Frequency Division Multiplexing (UF-OFDM, also sometimes referred to as Universal Filtered Multi Carrier) is one of the major 5G candidate waveform originally proposed by V. Vakilian, T. Wild, F. Schaich, S. ten Brink and J. F. Frigon, in "Universal-filtered multi-carrier technique for wireless systems beyond LTE," 2013 IEEE Globecom Workshops (GC Wkshps), Atlanta, Ga., 2013, pp. 223-228. The standard implementation of this waveform consists of dividing the sub-carriers into sub-bands which are independently filtered in time domain. UF-OFDM shows advantages for low-latency communications and enables the use of relaxed synchronization to save bandwidth and energy as described by F. Schaich and T. Wild, in "Relaxed synchronization support of universal filtered multi-carrier including autonomous timing advance," 2014 11th International Symposium on Wireless Communications Systems (ISWCS), Barcelona, 2014, pp. 203-208.

The majority of the techniques employed in OFDM can be reused without significant modification, for instance the Multi-Input Multi-Output (MIMO) Alamouti scheme.

However, the major issue of the UF-OFDM modulation is the computational complexity of the transmitter.

UF-OFDM, or UFMC, is a multi-carrier modulation. The principle of the multi-carrier modulation is to transmit data over multiple channels in the frequency domain, called sub-carriers. If N is the total number of sub-carriers and $f_{samp}$ is the sampling frequency, then the frequency spacing between each channel (sub-carrier) is equal to $f_{samp/N}$.

The principle of UF-OFDM modulation is to group the input symbols into several sub-bands composed of Q sub-carriers. A maximum of K=N/Q sub-bands, each carrying Q sub-carriers, can be used. The secondary side-lobes, representing residual power outside a sub-band, of each sub-band are attenuated by filtering each sub-band independently by a corresponding filter of length L samples. Then, the filtered sub-bands are summed together. This forms the baseband samples, composed of N+L−1 samples and sampled at $f_{samp}$.

FIG. 1 shows a standard UF-OFDM encoder. As shown, the encoder comprises a Quadrature Amplitude Modulation (QAM) mapper 110, which outputs QAM symbols to a sub-band mapper 120. The sub-band mapper comprises a segmentor which chops the input stream into segmented symbols ($s_k(q)$), zero padded to obtain K segments of N symbols, and circularly shifted to position the sub-bands in their corresponding sub-carrier indexes.

Thus, for each sub-band k, the output symbols of the sub-band mapper have N symbols defining the N sub-carriers. Only Q sub-carriers, defining the sub-band index k, carry the data to transmit. The remaining sub-carriers are not used (zero padded). Thus, each sub-band is isolated from the others, and will be processed independently.

To summarise, the sub-band mapper is implemented using the following operations:
Segmentation,
Zero padding,
Circular shift.

The output of the sub-band mapper is received by each of K Inverse Fast Fourier Transform (IFFT) blocks 131, 132, 133, where K is the number of sub-bands, each IFFT being of size N. The IFFT blocks each provide the transformed symbols to respective filter 141, 142, 143, each composed of L samples and implementing a linear convolution. The outputs of the filters 141, 142, 143 are then summed by a summer 150 to obtain the final UF-OFDM signal.

Accordingly, the operation of the UF-OFDM encoder can be described as follows, $$y(n) = \sum_{q=0}^{Q-1} f_q(n) \sum_{k=0}^{K-1} s_k(q) e^{j2\pi \frac{kQ}{N} n}$$

$$f_q(n) = \sum_{l=0}^{L-1} f_Q(l) R_N(n-l) e^{j2\pi \frac{q}{N}(n-l)}$$

K is the number of sub-bands.
N is the total number of sub-carriers across all the sub-bands, so N=K sub-bands×Q sub-carriers per sub-band.
Q is the sub-band width (number of sub-carriers per sub-band).
L is the filter length.
$R_N$ is the rectangular function of length N: $R_N(n)=1, n \in \llbracket 0, N-1 \rrbracket$, else 0.
$s_k(q)$ denotes the input symbols to be transmitted in the qth sub-carrier of the kth sub-band.

$$s_k(q) = c(q+kQ)$$

Where c(i) is a stream of N=K×Q input symbols from a QAM mapper. If the number of QAM symbols to transmit is inferior to N, then the remaining input symbols must be filled with zero valued coefficients.

The function $f_Q(l)$ is the impulse response of the sub-band prototype, referred to hereafter as the UF-OFDM filter f(l) frequency shifted by half the sub-band size as follows:

$$f_Q(l) = f(l) e^{j\pi \frac{Q}{N} l}$$

Where $$e^{j\pi \frac{Q}{N} l}$$

is a linear phase rotation term.

The choice of the UF-OFDM filter f(l) is a design parameter. It is known for example to use the coefficients from the Chebyshev window, obtained as described by H. D. Helms in "Digital filters with equiripple or minimax responses," IEEE Transactions on Audio and Electroacoustics, vol. 19, pp. 87-94, March 1971, however many other filter designs are compatible with the UF-OFDM encoding, and the design and selection of such filters is outside the scope of the present disclosure.

On this basis, the computational complexity of the encoder corresponding to the required number of multiplications to compute one UF-OFDM symbol can be evaluated as follows.

The number of real multipliers (RM) per UF-OFDM symbol, where a complex multiplier corresponds to four real multipliers, is given by:

$$C_{RM}(\text{UF\_OFDM}) = B(C_{RM}(\text{FFT}_N) + 4L(L+N))$$

With $C_{RM}(\text{FFT}_N) = 4N \log_2(N) - 6N + 8$ (Split radix FFT Complexity), where B is the number of allocated sub-bands, corresponding to the number of sub-bands composed of non-zero valued input symbols.

If by way of example N is set to 2048 and L is set to 144, this gives the complexity values set out in table 1 below. For the results presented in the table below, the number of allocated sub-bands is equal to K=N/Q, the worst case. Other values will be obtainable for other numbers of allocated sub-bands. These may be compared with the values for standard OFDM implementations to provide the overhead values set out in table 1 indicating the increase in complexity implied by the OFDM solution.

| Sub-band size | $C_{RM}$ for OFDM | $C_{RM}$ for standard UF-OFDM implementation | Overhead |
|---|---|---|---|
| 4 | 77832 | 402127200 | x5167 |
| 8 | 77832 | 201063600 | x2583 |
| 16 | 77832 | 100531800 | x1292 |
| 32 | 77832 | 50265900 | x646 |
| 64 | 77832 | 25132950 | x323 |

A known proposal to reduce complexity in comparison to this approach is described by T. Wild and F. Schaich, in "A Reduced Complexity Transmitter for UF-OFDM," 2015 *IEEE 81st Vehicular Technology Conference (VTC Spring)*, Glasgow, 2015, pp. 1-6, however this solution increases the out-of-band leakage and decreases the signal-to-interference ratio while remaining highly complex.

In this proposal, the filtering stage and the summation of all the sub-bands are computed in the frequency domain (before the IFFT) instead of the time domain. To efficiently generate the transient states of the UF-OFDM data stream, the IFFT size is increased to 2N (instead of N), and only N+L−1 samples, corresponding to the UF-OFDM symbol, are kept. Additionally, the computation of the filtering stage in the frequency domain requires an IFFT of size $N_0$ and an FFT of size $2N_0$ for each sub-band, where $N_0 \geq Q$ is a design parameter. The higher the value of $N_0$, the higher the complexity, but the impact on the out-of-band leakage and the signal-to-interference ratio is reduced with respect to the standard solution presented above. Thus, the choice of the parameter $N_0$ imposes a compromise between complexity and performance.

FIG. 2 shows the structure of a prior art frequency domain UF-OFDM encoder.

The input symbols to transmit c(i) output by a QAM mapper (not shown) are segmented into K sub-bands of Q sub-carriers providing $s_k(q)$ samples by sub-band mapper 220.

For each sub-band k, $s_k(q)$ is zero padded with $(N_o-Q)/2$ zeros at its extremities by elements 231, 241, 251. The zero padded samples may be expressed as follows:

$$a_k(q) = \begin{cases} 0, q \in \left[0, \frac{N_0+Q}{2}-1\right] \\ s_k\left(q - \frac{N_0-Q}{2}\right), q \in \left[\frac{N_0-Q}{2}, \frac{N_0+Q}{2}-1\right] \\ 0, q \in \left[\frac{N_0+Q}{2}, N_0-1\right] \end{cases}$$

Then, for each sub-band k, and IFFT 232, 242, 252 is applied:

$$A_k(p) = \sum_{q=0}^{N_0-1} a_k(q) e^{j\frac{2\pi pq}{N_0}}$$

Next, $A_k(p)$ samples are zero padded with $N_0$ zeros for each sub-band by elements 233, 243, 253.

$$A'_k(p) = \begin{cases} A_k(p), p \in [0, N_0-1] \\ 0, p \in [N_0, 2N_0-1] \end{cases}$$

Then, for each sub-band k an FFT 234, 244, 254 of size $2N_0$ is computed:

$$a'_k(q) = \sum_{p=0}^{2N_0-1} A'_k(p) e^{-j\frac{2\pi pq}{2N_0}}$$

At the output of the FFTs 234, 244, 254, the samples $a'_k(q)$ are multiplied by the approximate of the frequency response of UF-OFDM filter $F_{cut}$ at respective multipliers 235, 245, 255:

$$b_k(q) = a'_k(q) F_{cut}(q)$$

This step corresponds to the per-sub-band filtering operation in the frequency domain. The computation of the $F_{cut}$ coefficients is explained by T. Wild and F. Schaich, in "A Reduced Complexity Transmitter for UF-OFDM," 2015 IEEE 81st Vehicular Technology Conference (VTC Spring), Glasgow, 2015, pp. 1-6.

An overlapping summation of the sub-bands is next performed, expressed as follows:

$$x(q) = \sum_{k=0}^{K-1} b'_k(\text{mod}_{2N}(q - kQ))$$

Where $b'_k$ are the zero padded $b_k$ samples by $2(n-N_0)$ samples. The $\text{mod}_x$ operator corresponds to the modulus x operation. This overlapping summation can be computed by using a zero padding operation and by applying a circular shift of kQ of these zero-padded samples $b'_k$ corresponding to the sub-band k, as implemented by elements 261, 262, 263, and then by summing the shifted and zero-padded samples for each sub-band at element 264.

Finally, the baseband samples y(n) are generated using an IFFT 270 of size 2N and by discarding all but the first N+L−1 samples at element 280:

$$y(n) = \sum_{q=0}^{2N-1} x(q)e^{-j\frac{2\pi qn}{N}}, n \in [0, N+L-1]$$

With N (number of sub-carriers)=2048, all sub-bands used (B=K) and a filter length L of 144, the following calculation complexity values may be determined for this implementation as a basis of comparison:

| Sub-band size | $N_0$ value | $C_{RM}$ for OFDM | $C_{RM}$ for frequency domain UF-OFDM implementation | Overhead |
|---|---|---|---|---|
| 4 | 32 | 77832 | 1130504 | X14.52 |
| 8 | 32 | 77832 | 651272 | X8.37 |
| 16 | 64 | 77832 | 747528 | X9.60 |
| 32 | 64 | 77832 | 459784 | X5.91 |
| 64 | 128 | 77832 | 508424 | X6.53 |

As discussed above, the standard implementation is estimated to be up to 100 times more complex than OFDM, and accordingly remains almost impossible to implement in practice. The best prior art solution as presented above still represents a dissuasive overhead in comparison to OFDM, whilst sacrificing some of the advantages of UF-OFDM with respect to OFDM.

It is desirable to efficiently generate the UF-OFDM transmitter baseband signal at a low computational complexity cost, whilst retaining the inherent advantages of UF-OFDM with respect to OFDM, and minimizing impact on the out-of-band leakage and the resulting signal-to-interference ratio with respect to the standard solution.

The out-of-band leakage is particularly important for UF-OFDM, since it improves the performance of the receiver in case of imperfect synchronization, and enables the coexistence of different types of encoder and sets of parameters in the same bandwidth. It also improves the robustness of the receiver against Doppler shift and Doppler spread. The signal-to-interference ratio is especially significant since it directly concerns the "quality" of the transmission and has an influence on the bit error rate.

SUMMARY OF THE INVENTION

In accordance with the present invention in a first aspect there is provided an encoder for performing multicarrier waveform based encoding on a series of input symbols, the encoder comprising:
  a segmentor adapted to output the input symbols in a sequence of respective segments each segment comprising a first plurality of symbols, the first plurality of symbols corresponding in number to the number of input symbols being assigned to each sub-band for a given sub-carrier index;
  a sub-band processor adapted to process each first plurality of symbols to obtain a first plurality of samples, the sub-band processor being further adapted to output the first plurality of samples in a predetermined sequence of respective processed segments, where each processed segment comprises a second plurality of samples corresponding in number to the number of input symbols being assigned to each sub-carrier for a given sub-band index; and
  a sub-carrier processor adapted to process each second plurality of samples to obtain an encoded output data stream.

In accordance with a development of the first aspect the segmentor is adapted to output the input symbols in a sequence of respective segments, each segment comprising a first plurality of symbols corresponding in number to the number of input symbols being assigned to each sub-band for a given sub-carrier index, and in a case where the input symbols are insufficient to fully populate all the segments, adding zeros to fully define segments.

In accordance with a further development of the first aspect the sub-band processor is adapted to perform an Inverse Fast Fourier Transform on each segment output by the segmentor to provide the first plurality of samples.

In accordance with a further development of the first aspect the encoded data stream is a UF-OFDM data stream, and the sub-carrier processor is characterized by being adapted to perform processing for the two extremity parts of the base band signal corresponding to the transient state of the UF-OFDM data stream and for a core part of the base band signal corresponding to the non-transient state of the UF-OFDM data stream separately, and
  further comprising a concatenator being adapted to concatenate the two processed extremity parts of the base band signal corresponding to the transient state of the UF-OFDM data stream and the processed core part of the base band signal corresponding to the non-transient state of the UF-OFDM data stream to obtain the UF-OFDM data stream.

In accordance with a further development of the first aspect the encoder comprises a sub-carrier core processor configured to process samples corresponding to the core part of the base band signal and a transient state processor configured to process a first extremity part of the baseband signal, and wherein the encoder further comprises a arithmetic unit configured to:
  either subtract samples corresponding to the first extremity part of the baseband signal from samples corresponding to the core part of the base band signal, or add samples corresponding to the first extremity part of the baseband signal to samples corresponding to the core part of the base band signal; and
  to obtain samples corresponding to the second extremity part of the baseband signal; and wherein
  the concatenator is adapted to concatenate the outputs of the transient state processor, the sub-carrier core processor, and the subtractor or the adder to obtain the UF-OFDM data stream.

In accordance with a further development of the first aspect the sub-carrier core processor comprises a first filter adapted to multiply each sample by a respective filter coefficient from a first set of filter coefficients, the first set of filter coefficients being defined by an FFT of a size corresponding in number to the total number of sub-carriers across the sub-bands performed on the impulse response of the UF-OFDM filter and subjected to a linear phase rotation, and further comprising an Inverse Fast Fourier Transform block performing an Inverse Fast Fourier transform on the output of the first filter,
  the sub-carrier core processor being further adapted to sort the output of the Fast Fourier transform block to output the values determined by the Inverse Fast Fourier Transform block in a predetermined sequence, and wherein the transient state processor comprises a second filter implementing a second function adapted to multiply each sample by a respective filter coefficient from a second set of filter coefficients, and an summation unit adapted to sum each value output by the second filter for a respective processed segment.

In accordance with a further development of the first aspect the first set of filter coefficients corresponds to a first plurality of coefficients extracted from the first output of an FFT performed on the frequency shifted UF-OFDM filter, the first plurality of coefficients being equal in number to the number of input symbols being assigned to each sub-carrier for a given sub-band index, and the FFT being of a size corresponding in number to the total number of sub-carriers across the sub-bands, the extracted coefficients being repeated a number of times equal to the number of input symbols being assigned to each sub-band for a given sub-carrier index, to obtain a second plurality of coefficients equal to in number the total number of sub-carriers across the sub-bands, the second plurality of coefficients being further subjected to a linear phase rotation term having an angle proportional to an index value of the respective sub-carrier.

In accordance with a further development of the first aspect the first extremity part is a prefix part of the baseband signal;
the second set of filter coefficients correspond to values obtained by calculating, for each sub-carrier, a third plurality of coefficients, the third plurality of coefficients being recursively calculated by multiplying the previously computed filter coefficient number by a linear phase rotation term having an angle proportional to an index value of the respective sub-carrier and by subtracting these multiplied coefficients by the successive sample number of the impulse response of the frequency shifted UF-OFDM filter, and
the second part is a suffix part of the baseband signal, and the arithmetic unit is adapted to subtract samples corresponding to the first extremity part of the baseband signal from samples corresponding to the core part of the base band signal to obtain samples corresponding to the second extremity part of the baseband signal.

In accordance with a further development of the first aspect the first extremity part is a suffix part of the baseband signal;
the second set of filter coefficients correspond to values obtained by calculating, for each sub-carrier, a third plurality of coefficients, the third plurality of coefficients being recursively calculated by multiplying the previously computed filter coefficient number by a linear phase rotation term having an angle proportional to an index value of the respective sub-carrier, and by subtracting these multiplied coefficients by the successive coefficient number of frequency shifted UF-OFDM filter; and
the second part is a prefix part of the baseband signal, and the arithmetic unit is adapted to add samples corresponding to the first extremity part of the baseband signal from samples corresponding to the core part of the base band signal to obtain samples corresponding to the second extremity part of the baseband signal.

In accordance with a further development of the first aspect the summation unit comprises a storage device configured to accumulate the output of the summation unit, and wherein the summation unit is configured to add the value of each successive output of the second filter to the value stored in the storage device and store the result in the storage device until the value in the storage device incorporates the sum of each value output by the second filter for a respective processed segment.

In accordance with a further development of the first aspect the first set of coefficients and the second set of coefficients further reflect a linear phase rotation so as to introduce a frequency shift to the UF-OFDM data stream, and wherein a circular shift unit is provided before the IFFT unit of the sub-carrier core processor.

In accordance with the present invention in a second aspect there is provided a method comprising the steps of:
segmenting a series of input symbols in a sequence of respective segments each segment comprising a first plurality of symbols, the first plurality of symbols corresponding to the number of input symbols being assigned to each sub-band;
processing each first plurality of symbols to obtain a corresponding first plurality of samples,
sorting the first plurality of samples in a predetermined sequence of respective processed segments, where each processed segment comprises a second plurality of samples corresponding in number to the number of input symbols being assigned to each sub-carrier for a given sub-band index; and
processing each second plurality of samples to obtain a UF-OFDM data stream.

In accordance with a development of the second aspect the step of processing each second plurality of samples to obtain a UF-OFDM data stream comprises:
a step of processing for the two extremity parts of the base band signal corresponding to the transient state of the UF-OFDM data stream and
a step of processing for a core part of the base band signal corresponding to the non-transient state of the UF-OFDM data stream separately; and
a step of concatenating the two processed extremity parts of the base band signal corresponding to the transient state of the UF-OFDM data stream and the processed core part of the base band signal corresponding to the non-transient state of the UF-OFDM data stream to obtain a UF-OFDM data stream.

In accordance with a development of the second aspect the step of:
processing for the two extremity parts of the base band signal corresponding to the transient state of the UF-OFDM data stream comprises processing a first extremity part of the baseband signal,
and the step of processing each second plurality of samples to obtain a UF-OFDM data stream comprises an additional step of either subtracting samples corresponding to the first extremity part of the baseband signal from samples corresponding to the core part of the base band signal, or adding samples corresponding to the first extremity part of the baseband signal to samples corresponding to the core part of the base band signal, to obtain samples corresponding to the second extremity part of the baseband signal.

In accordance with the present invention in a third aspect there is provided a method of defining a set of filter coefficients for use as the first set of filter coefficients of the first or second aspects, the method comprising the steps of:
sampling the frequency shifted UF-OFDM filter to obtain a first plurality of core filter coefficients,
zero padding the first plurality of core filter coefficients to obtain a set of padded core filter coefficients, the set of padded core filter coefficients comprising a number of coefficients equal to the total number of sub-carriers across the sub-bands, performing a FFT of size equal to the total number of sub-carriers across the sub-bands, to obtain a second plurality of core filter coefficients being equal in number to the total number of sub-carriers across the sub-bands, extracting a third plurality of core filter coefficients from the first outputs of the FFT performed in the preceding step, the third plurality of core filter coefficients being equal in number to the number of input symbols being assigned to each sub-carrier for a given sub-band index, repeating the extracted core filter coefficients until a fourth plurality of core filter coefficients equal in number to the total number of sub-carriers across the sub-bands is obtained, and subjecting the fourth plurality of core filter coefficients to a linear phase rotation.

In accordance with the present invention in a fourth aspect there is provided a method of defining a set of filter coefficients for use as the second set of filter coefficients of the first of second aspects, the method comprising the steps of:

sampling the frequency shifted UF-OFDM filter to obtain a first plurality of filter tail coefficients;

in a case where no value is available for a preceding iteration, setting an iterated coefficient value to 0, or otherwise in a case where a value is available for a preceding iteration, multiplying the cumulative iterated coefficient value by a linear phase rotation term;

adding a respective coefficient from first plurality of filter tail coefficient to the iterated coefficient number determined in the preceding iteration to obtain a cumulative iterated coefficient value;

repeating for each successive iterated coefficient until a second plurality of filter tail coefficients have been determined, the second plurality of filter tail coefficients being equal in number to the number of coefficients defining the UF-OFDM filter repeating for each sub-carrier until all values have been determined.

In accordance with the present invention in a fifth aspect there is provided a computer program adapted to perform the steps of the second, third or fourth aspects.

BRIEF DESCRIPTION OF THE DRAWINGS

The above and other advantages of the present invention will now be described with reference to the accompanying drawings, in which:

FIG. 8 shows a method in accordance with an embodiment;

FIG. 9 shows further detail of the method of FIG. 8 in accordance with certain embodiments;

FIG. 10 shows further detail of the method of FIG. 9 in accordance with certain embodiments;

DETAILED DESCRIPTION

In the context of the present invention, the term UF-OFDM is intended to include all encoding schemes in which:

The input symbols to transmit are segmented into groups of subcarriers, called subbands.

Each sub band is separately filtered.

More specifically, the frequency response of each separate filter may be centered at the center frequency of the corresponding sub-band so that the power of the secondary sidelobes of each subband may be attenuated.

For such a scheme, assuming N is divisible by Q, K=N/Q, where K is a positive integer, and Equation (1) becomes $$y(n) = \sum_{q=0}^{Q-1} f_q(n) \sum_{k=0}^{K-1} s_k(q) e^{j2\pi \frac{k}{K}n}$$

Defining $$\sum_{k=0}^{K-1} s_k(q) e^{j2\pi \frac{k}{K}n} = x_q(n)$$

Where $x_q(n)$ corresponds to an Inverse Fast Fourier Transform of size K of the sub-carrier number q of each of the K sub-bands.

On the basis of this observation, it follows that the fact that the IFFT of size K is a periodic function of K samples may be exploited by decomposing the N first samples of the baseband signal (y(n)) into Q segments of K samples (N=Q×K).

An encoder architecture may be proposed on the basis of this insight.

Figure 1:
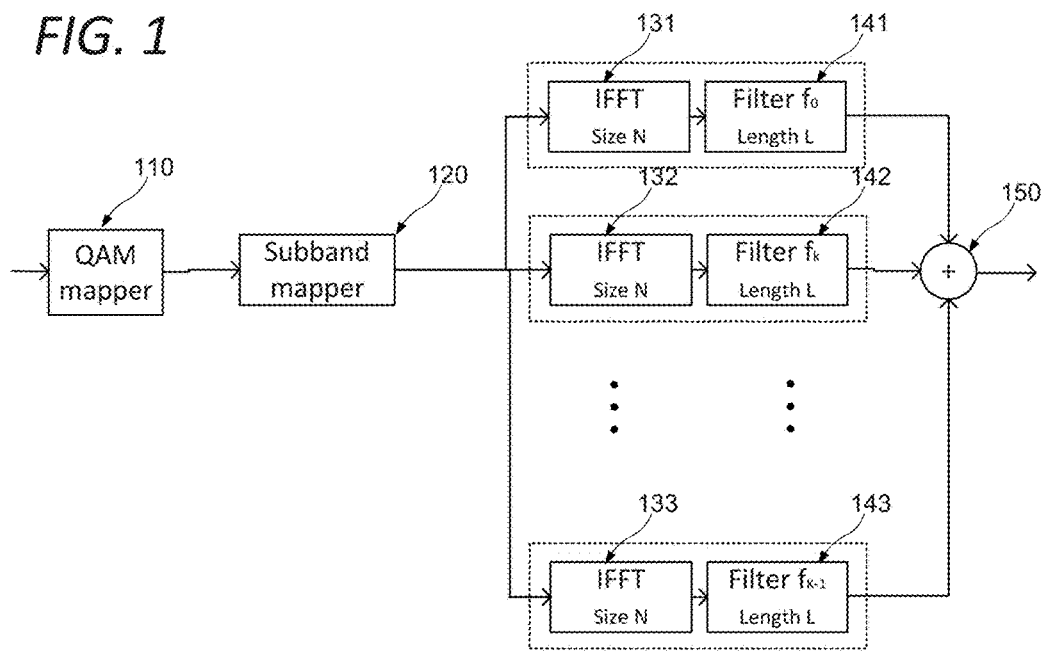
FIG. 1 shows a standard UF-OFDM encoder.
Figure 2:
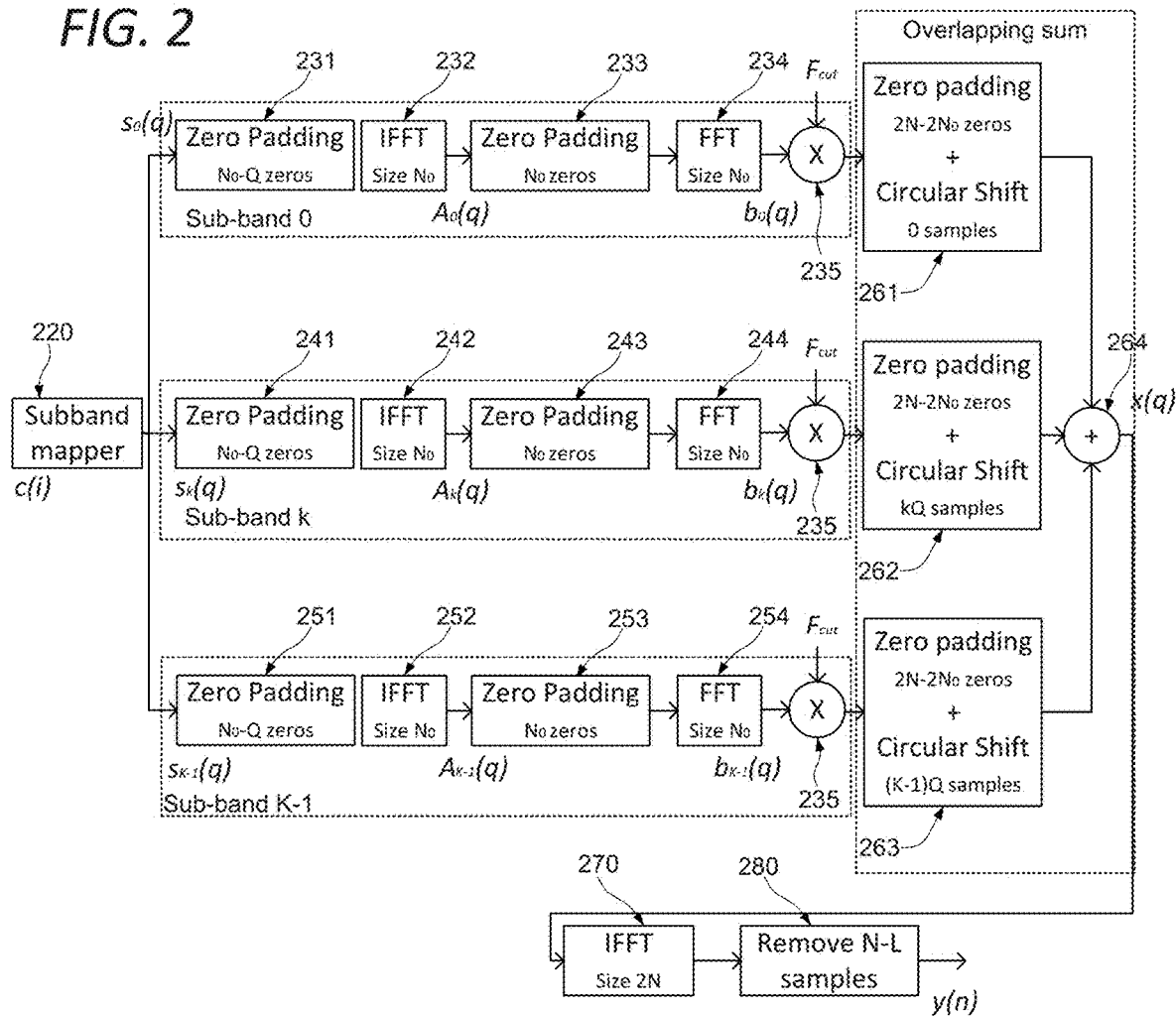
FIG. 2 shows the structure of a prior art frequency domain UF-OFDM encoder.
Figure 3:
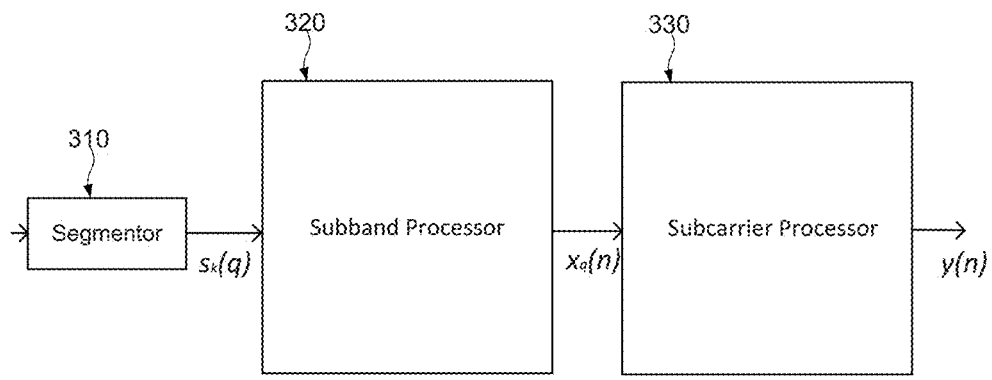
FIG. 3 shows an encoder according to a first embodiment.

FIG. 3 shows an encoder according to a first embodiment.

As shown in FIG. 3, there is provided an encoder for performing UF-OFDM encoding on a series of input symbols.

The encoder of FIG. 3 comprises a segmentor 310 adapted to output input symbols in a sequence of respective segments, where each segment comprises a first plurality of symbols. This first plurality corresponds to the number of input symbols being assigned to each sub-band for a given sub-carrier index, K as defined above. The input symbols here may be QAM, QPSK or other complex symbols.

The encoder further comprises a sub-band processor 320 adapted to process each first plurality of symbols to obtain a first plurality of samples. On the basis of equation 5 the operation performed by the sub-band processor may comprise an IFFT of size K to be performed on each set of K symbols assigned to each sub-band for a given sub-carrier, that is to say, the sub-band processor is adapted to perform an Inverse Fast Fourier Transform on each segment output by the segmentor to provide a first plurality of samples.

The sub-band processor is further adapted to output the first plurality of samples in a predetermined sequence of respective processed segments, where each processed segment comprises a second plurality of samples corresponding in number to the number of input symbols being assigned to each sub-carrier for a given sub-band, as defined above.

The encoder further comprises a sub-carrier processor 330 adapted to process each processed segment, as output by the sub-band processor 320, to obtain a UF-OFDM data stream.

It will be appreciated that this structure is dependent on the proper mapping of samples from sub-band to sub-carrier, on the basis of the sub-band processor's adaptation to output the samples in the proper predetermined sequence.

Figure 4:
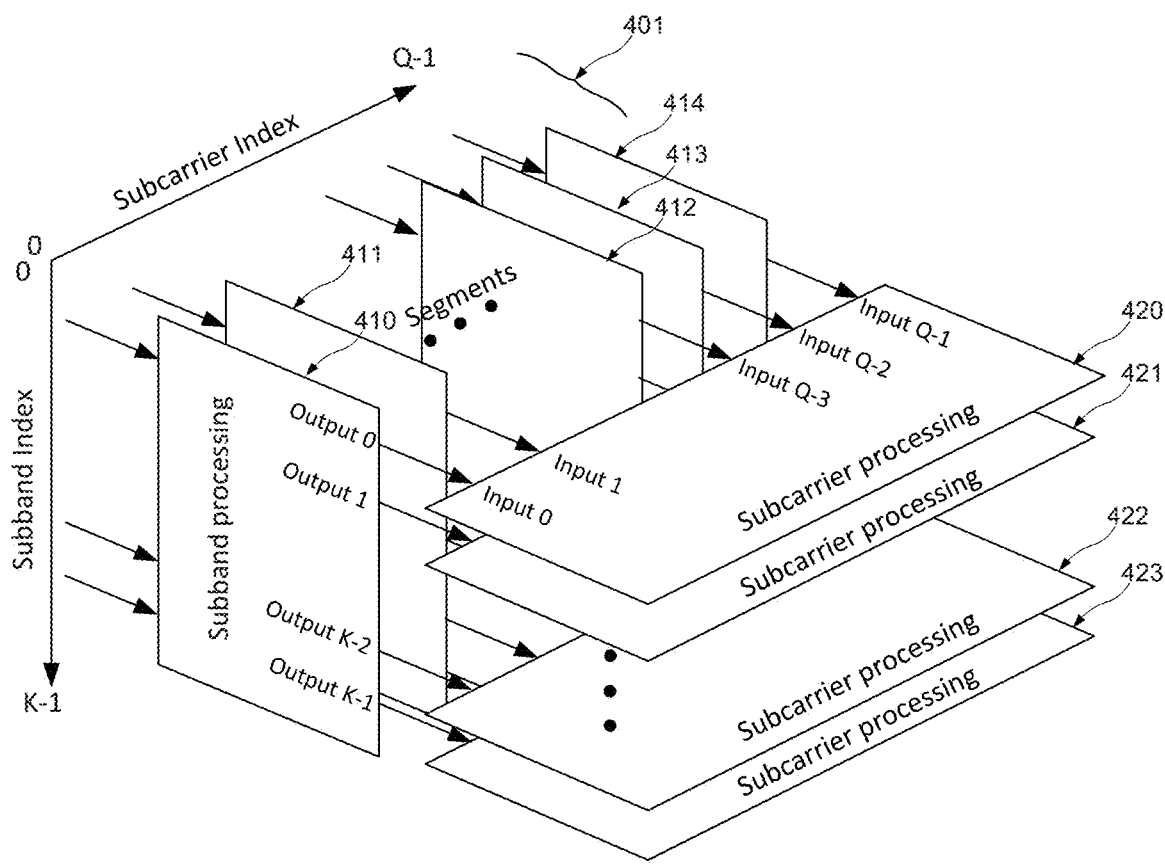
FIG. 4 illustrates the operation of the sub-band processor to output samples in a predetermined sequence.

FIG. 4 illustrates the operation of the sub-band processor to output the samples in a predetermined sequence.

As shown, a set of K×Q samples 401 arrives and is split into segments e.g. by the segmentor 310 discussed above, each segment corresponding to a respective one of the Q defined sub-bands 410, 411, 412, 413, 414. The processing of one segment corresponding to each sub-band for a given sub-carrier index produces K outputs, so that the total output from processing all the sub-bands is once again K×Q.

In a case where the QAM symbols to transmit are insufficient to define the Q×K input symbols of the UF-OFDM encoder, the sequence of QAM symbols must be appended with zero valued symbols until there are sufficient input symbols.

In accordance with certain embodiments, the sub-band processor may be required to output the samples in a predetermined sequence. This sequence may correspond to the sequence required to inject each output of the sub-band processor 320 into the sub-carrier processing performed for example by sub-carrier processor 330 in the proper sequence so as to be processed in the sequence of samples assigned to that same sub-carrier. As shown in FIG. 4, the distribution of samples across sub-carriers processing 420, 421, 422 et 423 is transversal to the distribution of samples across sub-bands, such that one sample from each sub-band is assigned to a respective sub-carrier, and correspondingly each sub-carrier receives one input from each sub-band. This implies an interleaving operation where the processed outputs for each sub-band are dispersed across the different sub-carriers.

It may be noted that while FIG. 4 shows sub-band processing 410, 411, 412, 413, 414 as separate elements and as such may imply a parallel processing of each sub-band in a parallel system architecture, it is also possible to perform this separate processing in a serial manner in a single processing pipeline, as presented in certain of the following embodiments. Similarly, while FIG. 4 shows sub-carrier processing 420, 421, 422, 423 as separate elements and as such may imply a parallel processing of each sub-carrier in a parallel system architecture, it is also possible to perform this separate processing in a serial manner in a single processing pipeline, as presented in certain of the following embodiments.

This may be achieved by buffering the K×Q outputs of the sub-band processing stage and then reading out the values in the desired order reflecting this interleaving, or alternatively by providing for parallel sub-carrier processing so that each output value from the sub-band processing stage can be fed directly into the proper sub-carrier processing calculation, or by synchronizing processing across the units as described further hereafter.

This embodiment thus separates the UF-OFDM function into a sub-band processing part and a sub-carrier processing part. An advantage of processing first the samples related to the sub-band indexes in the sub-band processor 320, then processing the samples related to the sub-carrier indexes in the sub-carrier processor is that this makes it possible to drastically reduce the number of redundant operations to compute. In fact, the sub-band processor computes separately Q segments of only K samples and the sub-carrier processor computes separately K segments of only Q samples. Thus, the number of samples to process in a segment is reduced, which in turn reduced the overall complexity of the UF-OFDM transmitter.

In accordance with the foregoing discussion, the number of samples, N is divisible by the first and third pluralities K: input symbols being assigned to each sub-band for a given sub-carrier index and Q, number of inputs assigned to each sub-carrier for a given sub-band index.

With regard to the operation of the Sub-carrier processor 330, defining the fragmented signal $y_p(n)=y(n'+pK)$, $n' \in [0,K-1]$, $p \in [0,Q-1]$, we have $$y_p(n') = \sum_{q=0}^{Q-1} f_q(n' + pK) x_q(n')$$

The filter coefficients $f_q(n)$ of equation (6) can be simplified when $n \in [L,N-1]$. Indeed, equation (2) becomes $$f_q(n) = e^{j2\pi \frac{q}{N}(n)} \sum_{l=0}^{L-1} f_Q(l) e^{-j2\pi \frac{q}{N} l}$$

Furthermore, when $(n'+pK) \in [L,N-1]$:

$$f_q(n' + pK) = e^{j2\pi \frac{q}{Q}(p)} e^{j2\pi \frac{q}{N}(n')} \sum_{l=0}^{L-1} f_Q(l) e^{-j2\pi \frac{q}{N} l}$$

$$f_q(n' + pK) = e^{j2\pi \frac{q}{Q}(p)} F_q(n')$$

With $$F_q(n') = e^{j2\pi \frac{q}{N} n'} \sum_{l=0}^{L-1} f_Q(l) e^{-j2\pi \frac{q}{N} l}$$

On this basis, it becomes possible to perform processing for a core part of the baseband signal corresponding to the non-transient state of the UF-OFDM data stream on one hand, and for the two extremity parts of the baseband signal corresponding to the transient state of the UF-OFDM data stream on the other, separately.

The coefficients of the core filter $F_q(n')$ are obtained by first applying an FFT of size N on the frequency shifted UF-OFDM filter $f_Q(l)$, where zero padding is applied. Then, from the result of this FFT, only the first Q coefficients are kept (since q∈[0,Q−1]), and these extracted samples are repeated K times to obtain N coefficients. Finally, a linear phase rotation is applied to these repeated coefficients, as indicated by the term $e^{j2\pi q/N(n')}$. The angle of the linear phase rotation term depends on the sub-carrier number. In total, Q×K=N coefficients are generated.

For (n'+pK)∈[L,N−1], equation (6) becomes $$y_p(n') = \sum_{q=0}^{Q-1} z_q(n') e^{j2\pi \frac{q}{Q} p}$$

Where $z_q(n') = F_q(n') \times x_q(n')$

The $z_q(n')$ samples are obtained after multiplication of the $x_q(n')$ samples and the core filter coefficients $F_q(n')$ as expressed in equation (10).

The sample number n of each of the Q fragments is calculated using the IFFT of size Q of the filtered signals $z_q(n')$ across the Q sub-carriers.

Equation (11) processes the part of the signal where the linear convolution of the filter is equivalent to a circular convolution such that the transient states of the signal are removed. The core part of the baseband signal, defined for n∈[L,N−1] is expressed as follows:

$$ycore(n) = y_{\lfloor \frac{n}{K} \rfloor}(\mathrm{mod}_k(n))$$

After computation of the core part (n∈[L,N−1]), the prefix ($n_q = n \in [0,L-1]$) and suffix ($n_s = n \in [N,N+L-1]$) parts of the baseband signal must be calculated.

When $n_q \in [0,L-1]$ (prefix part) equation (2) of the filter coefficients becomes $$f_q(n_p) = e^{j2\pi \frac{q}{N} n_p} \sum_{l=0}^{n_p} f_Q(l) e^{-j2\pi \frac{q}{N} l} = P_q(n_p)$$

The $P_q(n_q)$ samples correspond to the prefix filter tail coefficients. An efficient way to calculate these coefficients is to note that:

$$P_q(n_p+1) = e^{j2\pi \frac{q}{N}(n_p+1)} \sum_{l=0}^{n_p+1} f_Q(l) e^{-j2\pi \frac{q}{N} l} =$$

$$e^{j2\pi \frac{q}{N}(n_p+1)} \left( \sum_{l=0}^{n_p} f_Q(l) e^{-j2\pi \frac{q}{N} l} + f_q(n_p+1) e^{-j2\pi \frac{q}{N}(n_p+1)} \right)$$

Where $$P_q(n_p+1) = f_Q(n_p+1) + e^{j2\pi \frac{q}{N}} P_q(n_p)$$

Thus the prefix filter tail coefficients number n+1 of the sub-carrier number q can be computed by multiplying the previously computed prefix filter tail coefficient by a linear phase rotation and by adding the result of this multiplication by the sample number $n_p+1$ of frequency shifted UF-OFDM filter.

When $n_s \in [N,N+L-2]$ (suffix part), equation 2 of the filter coefficients becomes:

$$f_q(n_s) = e^{j2\pi \frac{q}{N} n_s} \sum_{l=n-N+1}^{L-1} f_Q(l) e^{-j2\pi \frac{q}{N} l} = S_q(n_s)$$

This equation can be decomposed as follows:

$$S_q(n_s) = e^{j2\pi \frac{q}{N} n_s} \left( \sum_{l=0}^{L-1} f_Q(l) e^{-j2\pi \frac{q}{N} l} - \sum_{l=0}^{n-N} f_Q(l) e^{-j2\pi \frac{q}{N} l} \right) = F_q(n_s) = P_q(n_s - N)$$

Thus $S_q(n_s) = F_q(n_s) - P_q(n_s - N)$

So the suffix filter tail coefficients can be deduced by subtracting the coefficients of the core filter from the prefix filter tail coefficients.

Similarly, the prefix filter tail coefficients can be deduced by adding the coefficients of the core filter to the suffix filter tail coefficients.

From the equations of the prefix and the suffix filter tail coefficients, the prefix and suffix part of the baseband signal can be deduced from equation (2):

For $n_q \in [0,L-1]$ $$y_{prefix}(n_p) = \sum_{q=0}^{Q-1} P_q(n_p) x_q(n_p)$$

The samples corresponding to the prefix part of the baseband signal are obtained by multiplying the $x_q(n_q)$ samples to the prefix filter tail coefficients $P_q(n_q)$, then by summing (over q) all the Q filtered samples $(P_q(n_q)x_q(n_q))$ for each sample n.

An equivalent operation may be determined using the suffix tail coefficients to determine the suffix part.

Finally, for 0≤n≤N+L−2, the baseband signal is obtained after concatenation of the prefix, core and suffix part of the baseband samples.

$$y(n) = \begin{cases} y_{prefix}(n), n \in [0, L-1] \\ y_{\lfloor \frac{L+n}{K} \rfloor}(\mathrm{mod}_K(L+n)), n \in [L, N-1] \\ y_{suffix}(n), n \in [N, N+L-1] \end{cases}$$

With $$y_{prefix}(n_p) = \sum_{q=0}^{Q-1} P_q(n_p) x_q(n_p)$$

$$y_{core}(n_p) = y_{\lfloor \frac{N+n}{K} \rfloor}(\mathrm{mod}_K(n_p))$$

$$y_p(n') = \sum_{q=0}^{Q-1} F_q(n') x_q(n') e^{j2\pi \frac{q}{Q} p}$$

$$y_{suffix}(n_s) = \sum_{q=0}^{Q-1} S_q(n_s) x_q(n_s)$$

Figure 5:
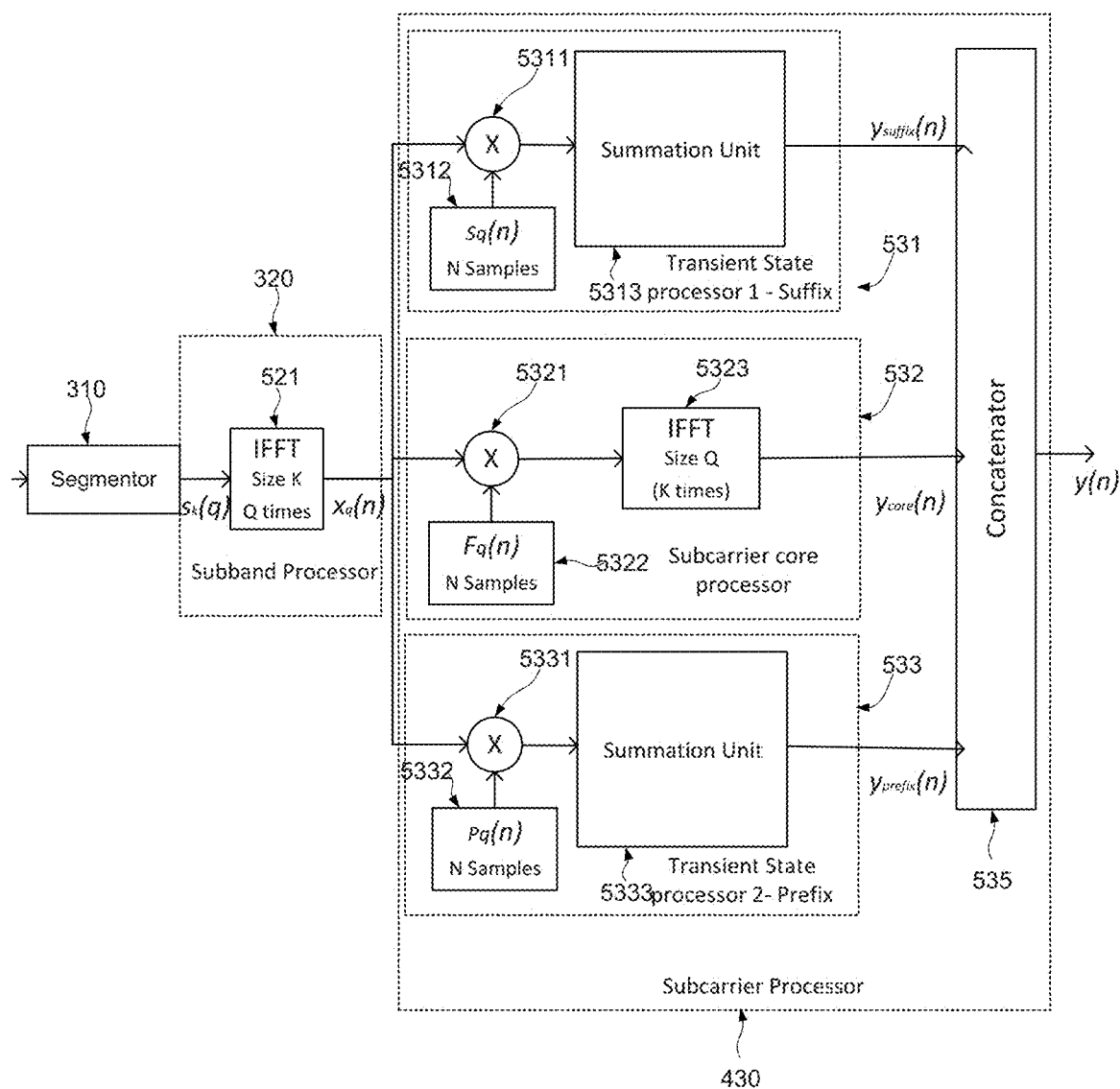
FIG. 5 shows an encoder according to a second embodiment.

FIG. 5 shows an encoder according to a second embodiment.

As shown in FIG. 5, there is provided an encoder corresponding in structure to that shown in FIG. 3, comprising a segmentor 310 and sub-band processor 320 as described above, and a sub-carrier processor 430. In this embodiment, the sub-carrier processor 430 is adapted to perform processing for the two extremity parts of the baseband signal corresponding to the transient state of the UF-OFDM data stream and for a core part of the base band signal corresponding to the non-transient state of the UF-OFDM data stream separately in first transient state processor 531, second transient state processor 533 and sub-carrier core processor 532, and further comprises a concatenate 535 adapted to concatenate the two processed extremity parts of the base band signal corresponding to the transient state of the UF-OFDM data stream as output by the first transient state processor 531 and second Transient state processor 533 and the processed core part of the base band signal corresponding to the non-transient state of the UF-OFDM data stream as output by sub-carrier core processor 532 to obtain a UF-OFDM data stream.

Implementing equation 12 above, the sub-carrier core processor 532 multiplies of the $x_q(n)$ samples in multiplier 5321 by core filter coefficients $F_q(n')$ stored in memory 5322 as expressed in equation (10). The sample number n of each of the Q segments is then calculated using the IFFT 5323 of size Q of the filtered signals $z_q(n')$ across the Q sub-carriers.

As such, the sub-carrier core processor 532, may comprise a first filter adapted to multiply each sample by a respective filter coefficient from a first set of filter coefficients, the first set of filter coefficients being defined by a number of coefficients corresponding to the extracted and repeated first output of an FFT (of size equal to the total number of sub-carriers across all the sub-bands, N) performed on the frequency shifted UF-OFDM filter, and subjected to a linear phase rotation.

The sub-carrier core processor 532 may further comprise an Inverse Fast Fourier Transform block performing an Inverse Fast Fourier transform on the output of the first filter.

On the basis of the foregoing discussion, the first transient state processor 531 processes the samples corresponding to the prefix part of the baseband signal by multiplying the $x_q(n')$ samples in multiplier 5311 by the prefix filter tail coefficients $P_q(n_q)$ stored in memory 5312, then by summing (over q) all the Q filtered samples $(P_q(n_q)x_q(n_q))$ for each sample n in summation unit 5313, thereby implementing equation 18 above.

Similarly, second transient state processor 533 processes the samples corresponding to the suffix part of the baseband signal by multiplying the $x_q(n_q)$ samples in multiplier 5331 to the suffix filter tail coefficients $S_q(n_s)$ stored in memory 5332, then by summing (over q) all the Q filtered samples $(S_q(n_s)x_q(n_s))$ for each sample n in summation unit 5333.

As such, a transient state processor may comprise a second filter implementing a second function corresponding to multiplying each sample by a respective filter coefficient from a second set of filter coefficients, the second set of filter coefficients being defined by recursively calculating, for each sub-carrier index, each coefficient by multiplying the previously computed filter tail coefficient number by a linear phase rotation term and by adding these multiplied coefficients by the successive sample number of the frequency shifted UF-OFDM filter.

The concatenator 535 then concatenates the prefix values, then core, then suffix value outputs of the units 531, 532, 533 to obtain the final UF-OFDM signal.

The proper concatenation of the values generated by units 531, 532, 533 may imply the buffering of values at the outputs.

Furthermore, separating the transient-state of the baseband sample reduces the number of redundant operations in the sub-carrier processor, by separating the computation of the transient-state of the baseband samples (high computational complexity but on a few number of samples) and the core part of the baseband samples (low computational complexity on a large number of samples).

While for the sake of simplicity the operation of the sub-band processor and sub-carrier processor has been described in a substantially sequential, batch-wise process, with a complete set of sub-band calculations being performed before sub-carrier values are fed sub-carrier by sub-carrier into the sub-carrier processor, it will be appreciated that as mentioned above the same operations may be performed in a continuous mode with careful synchronization between the different functional units.

Meanwhile, it may be noted that for $n_s \in [N, N+L-2]$:

$$y(n_s) = \sum_{q=0}^{Q-1} F_q(n_s) - P_q(n_s - N)x_q(n_s)$$

Due to the periodicity of $x_q(n_s)$ and $F_q(n_s)$, the above equation is equivalent to:

$$y(n_s) = \sum_{q=0}^{Q-1} F_q(n_s - N) - P_q(n_s - N)x_q(n_s - N)$$

Thus the suffix part of the signal can be defined for $n \in [0, L-2]$ as follows:

$$y_{suffix}(n_s) = y(n_s + N) = \sum_{q=0}^{Q-1} F_q(n_s) - P_q(n_s)x_q(n_s)$$

$$y_{suffix}(n_s) = y_{core}(n_s) - y_{prefix}(n_s)$$

The definition of $y_{core}(n)$ is extended to $n \in [0, N-1]$ instead of $n \in [L, N-1]$ as defined with reference to equation 12. The samples in the interval $[0, L-1]$ are only generated to compute the suffix part of the baseband signal. The samples in the interval $([L, N-1])$ correspond to the core part of the baseband sample.

Accordingly, for $0 \leq n \leq N+L-2$, the baseband signal may be obtained after concatenation of the prefix, core and suffix part of the baseband samples.

$$y(n) = \begin{cases} y_{prefix}(n), n \in [0, L-1] \\ y_{\left|\frac{L+n}{K}\right|}(\mathrm{mod}_K(L+n)), n \in [L, N-1] \\ y_{suffix}(n), n \in [N, N+L-2] \end{cases}$$

With $$y_{prefix}(n_p) = \sum_{q=0}^{Q-1} P_q(n_p) x_q(n_p)$$

$$y_{core}(n) = y_{\left|\frac{N+n}{K}\right|}(\mathrm{mod}_K(n_p))$$

$$y_p(n) = \sum_{q=0}^{Q-1} F_q(n) x_q(n) e^{j2\pi \frac{q}{Q} p}$$

$$y_{suffix}(n_s) = y_{core}(n_s) - y_{prefix}(n_s)$$

Figure 6:
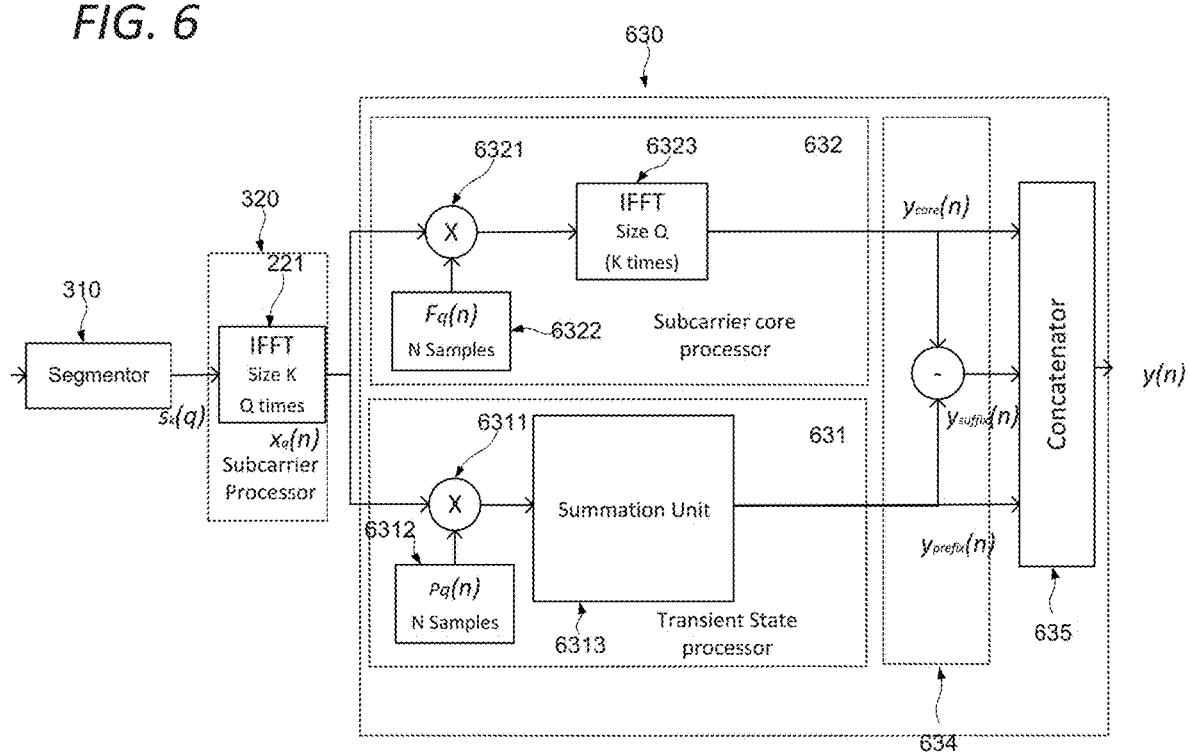
FIG. 6 shows an encoder according to a third embodiment.

FIG. 6 show an encoder according to a third embodiment.

As shown in FIG. 6, an encoder comprises the segmentor 310 and sub-carrier processor 320 of FIG. 3. Furthermore, as shown in FIG. 6 the sub-carrier processor 630 comprises core processor 632 configured to process samples corresponding to the core part of the base band signal as discussed above, and a transient state processor 631 configured to process a first the extremity part (which may be the suffix or the prefix part) of the baseband signal and an arithmetic unit 634 configured to process the samples corresponding to a second extremity part of the baseband signal (which will be whichever extremity part is not taken to be the first extremity part).

Similarly to the embodiment of FIG. 5, the sub-carrier processor 630 is adapted to perform processing for the two extremity parts of the baseband signal corresponding to the transient state of the UF-OFDM data stream and for a core part of the base band signal corresponding to the non-transient state of the UF-OFDM operation separately in transient state processor 631, and sub-carrier core processor 632, and further comprises a concatenator 635 adapted to concatenate the two processed extremity parts of the base band signal corresponding to the transient state of the UF-OFDM data stream as output by the first transient state processor 631 and the processed core part of the base band signal corresponding to the non-transient state of the UF-OFDM data stream as output by sub-carrier core processor 632 to obtain a UF-OFDM data stream.

Implementing equation 12 above, the sub-carrier core processor 632 multiplies the $x_q(n)$ samples in multiplier 6321 by core filter coefficients $F_q(n)$ stored in memory 6322 as expressed in equation (10). The sample number n of each of the Q segments is then calculated using the IFFT 6323 of size Q of the filtered signals $z_q(n)$ across the Q sub-carriers.

As such, the sub-carrier core processor 632, may comprise a first filter adapted to multiply each sample by a respective filter coefficient from a first set of filter coefficients, the first set of filter coefficients being defined by coefficients corresponding to the extracted and repeated first output of an FFT of size equal to the total number of sub-carriers across all the sub-bands, N) performed on the frequency shifted UF-OFDM filter, and subjected to a linear phase rotation.

The sub-carrier core processor 632, may further comprise an Inverse Fast Fourier Transform block 6323 performing an Inverse Fast Fourier transform on the output of the first filter.

In accordance with the embodiment of FIG. 6, the sub-carrier processor further comprises a arithmetic unit 634 configured calculate the suffix values from the prefix values on the basis of equation 22 above, or to calculate the prefix values from pre-calculated suffix values on the basis a reverse application of the sample principles.

Specifically, where the arithmetic unit 634 is configured calculate the suffix values from the prefix values on the basis of equation 22 above, it is arranged to subtract samples corresponding to the first extremity part of the baseband signal from samples corresponding to the core part of the base band signal.

Alternatively, where the arithmetic unit 634 is configured calculate the suffix values from the prefix values on the basis of equation 22 above, it is arranged to add samples corresponding to the core part of the base band signal from samples corresponding to the first extremity part of the baseband signal.

On the basis of the foregoing discussion, the first transient state processor 631 processes the samples corresponding to the prefix part of the baseband signal by multiplying the $x_q(n_q)$ samples in multiplier 6311 to the prefix filter tail coefficients $s_q(n)$ stored in memory 6312, then by summing (over q) all the Q filtered samples $(P_q(n_q)x_q(n_q))$ for each sample n in summation unit 6313, thereby implementing equation 18 above.

As such, a transient state processor may comprise a second filter implementing a second function corresponding to multiplying each sample by a respective filter coefficient from a second set of filter coefficients, the second set of filter coefficients being defined by recursively calculating, for each sub-carrier index, each coefficient by multiplying the previously computed filter tail coefficient number by a linear phase rotation term and by adding these multiplied coefficients by the successive sample number of the frequency shifted UF-OFDM filter.

The concatenator 635 is then adapted to concatenate the outputs of the transient state processor, the sub-carrier core processor and the subtractor or the adder to obtain the UF-OFDM data stream.

As such, this embodiment makes it possible to achieve the same results as those of the embodiment of FIG. 5, but with recourse to only a single transient state processor, whereby the output of the omitted transient state processor is deduced from the values output by the sub-carrier core processor and the (single) transient state processor. This represents a significant additional saving in system complexity, semiconductor footprint and the like.

Figure 7:
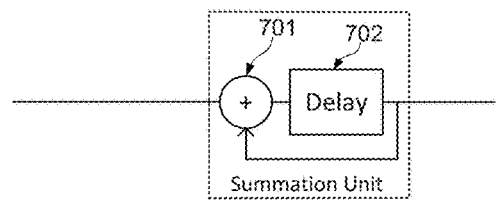
FIG. 7 shows details of a summation unit in accordance with certain embodiments.

FIG. 7 shows details of a summation unit in accordance with certain embodiments.

Implementation of equation 18, for example in the transient state processor units of the embodiments of FIGS. 5 and 6, has called for summation units. By way of example in accordance with certain embodiments the summation can be computed using an accumulator.

As shown in FIG. 7 this consists of an adder stage 701 followed by a delay operation of one sample 702. The addition is realized between the input sample of the accumulator (such as the $(P_q(n)x_q(n))$ filtered samples) and the delayed sample. The delay operation can be implemented with a memory of one element (a register).

Any summation unit such as 5313, 5333, 6313 may thus comprise a storage device configured to accumulate the output of the summation unit, and wherein the summation unit is configured to add the value of each successive output of a respective second filter (5311, 5331, 6311) to the value stored in that storage device and store the result in the storage device until the value in the storage device incorporates the sum of each of the third values output by the respective second filter for a respective processed segment.

Other possible implementations include a fully parallel implementation with multiple adders and no delay.

Frequency Shift

In some cases, for example where it is required to centre the bandwidth at a specified central frequency, it may be desirable to impose a frequency shift at sub-carrier level. A straightforward way to achieve this with embodiments of the present invention is to apply a linear phase rotation on the baseband samples y(n):

$$y'(n) = e^{j2\pi \frac{c_0}{N}(n)} y(n)$$

Where $c_0$ is the number of frequency shifted sub-carriers ($c_0 \in [-Q+1, Q-1]$). However, this linear phase rotation may increase the complexity of the transmitter by adding 4(N+L−1) real multipliers. It is however possible to compute this term more efficiently.

For the prefix part of the baseband samples ($y_{prefix}(n_q)$), the linear phase rotation term can be included in the $P_q(n)$ coefficients:

$$P'_q(n_p) = e^{j2\pi \frac{c_0}{N}(n_p)} P_q(n_p)$$

For the core part of the baseband samples ($y_{core}(n)$), the fragmented samples ($y_q(n)$) can be expressed as follows:

$$y'_p(n_p) = e^{j2\pi \frac{c_0}{N}(n_p+pK)} \sum_{q=0}^{Q-1} z_q(n_p) e^{j2\pi \frac{q}{Q}p} = e^{j2\pi \frac{c_0}{Q}p} \sum_{q=0}^{Q-1} z_q(n_p) e^{j2\pi \frac{c_0}{N}n_p} e^{j2\pi \frac{q}{Q}p}$$

The term $$e^{j2\pi \frac{c_0}{N}n_p}$$

can be included in the core filter coefficients $F_q(n)$, and $$e^{j2\pi \frac{c_0}{Q}p}$$

is equivalent to a circular shift of $c_0$ samples applied on the inputs of the IFFT of size Q (on the $z_q(n_q)$ samples).

$$y'_p(n_p) = \sum_{q=0}^{Q-1} z'_{q-c_0}(n_p) e^{j2\pi \frac{q}{Q}p}$$

with $z'_q(n_q) = F_q'(n_q) x_q(n_q)$ and $$F'_q(n_p) = e^{j2\pi \frac{c_0}{N}(n_p)} F_q(n_p)$$

Since the linear shift rotation term is periodic (period of N samples), the demonstration concerning the derivation of the suffix values from the pre-calculated prefix and core values is unchanged, so the computation of the suffix part of the baseband samples is not modified.

Accordingly, the linear shift rotation may be implemented simply by changing the values of the coefficients stored in storage means 5312, 5322 and 5332, or 6322 and 6332, for example in accordance with the foregoing calculations.

Embodiments may additionally take the form of methods comprising one or more steps.

It will be appreciated that the described structure incorporates the functionality of an IFFT of a size corresponding to the total number of sub-carriers across the sub-bands of the UF-OFDM signal it is designed to process. This IFFT may be used to support other functionalities.

In particular, the IFFT functionality may for example be used to implement OFDM encoding.

Compatibility with OFDM Signals

It will be appreciated that by separating the sub-band and sub-carrier processing in the manner described herein, it also becomes possible to switch the encoder to produce a UF-OFDM signal to producing an OFDM signal, by adjusting the processing performed by the sub-carrier part alone. In particular, in embodiments such as those of FIG. 5 or FIG. 6 based on multiplication of parts of the baseband signal by filter coefficients e.g. as performed by filters 5311/5312, 5321/5322 and 5331/5332, or 6321/6322 and 6331/6332, the sub-carrier processor may be switched to OFDM operation merely by changing the values of the coefficients stored in storage means 5312, 5322 and 5332, or 6322 and 6332, for example.

Specifically, the OFDM baseband samples can be computed as follows:

$$y(n) = \sum_{k=0}^{N-1} s_k(q) e^{j2\pi \frac{k}{N}n}, n \in [-L, N-1]$$

where L is the length of the cyclic prefix. This can be decomposed into sub-bands as in UF-OFDM:

$$y(n) =$$

$$\sum_{q=0}^{Q-1} \sum_{k=0}^{K-1} s_k(q) e^{j2\pi \frac{Qk+q}{N}n} = \sum_{q=0}^{Q-1} e^{j2\pi \frac{q}{N}n} \sum_{k=0}^{K-1} s_k(q) e^{j2\pi \frac{k}{K}n} = \sum_{q=0}^{Q-1} x(q) e^{j2\pi \frac{q}{N}n}$$

For $n+pK \in [0, N-1]$, the baseband samples can be segmented as follows $$y_p(n') = \sum_{q=0}^{Q-1} F_q(n') x_q(n') e^{j2\pi \frac{q}{Q}p}, F_q(n') = e^{j2\pi \frac{q}{N}n'}$$

Thus, the OFDM baseband signal (without the cyclic prefix) can be generated by using the equation of the UF-OFDM core part and by changing the core filter coefficients by $$F_q(n') = e^{j2\pi \frac{q}{N}n'}$$

Meanwhile, the prefix cyclic part for OFDM can be generated either by copying the L last samples of the core part to the beginning of the baseband signal, or by using a similar approach to that defined for the prefix part for UF-OFDM processing.

$$y_{prefix(n_p)} = y(n_p - L)(n \in [0, L-1])$$

$$y_{prefix(n_p)} = \sum_{q=0}^{Q-1} x_q(n_p - L)e^{j2\pi \frac{q}{N}(n_p-L)}$$

The UF-OFDM prefix filter tail coefficients must be replaced by $$P_q(n_p) = e^{j2\pi \frac{q}{N}(n_p-L)}$$

Furthermore, the $x_q(n_q)$ samples must be processed in an inverse order:

In the case of UF-OFDM, the summation of the Q sub-carriers is computed for each sample $x_q(n_q)$ from sample $x_q(0)$ to sample $x_q(L-1)$ In the case of OFDM, the summation of the Q sub-carriers is computed for each sample xq($n_q$-L) from sample $x_q(-L)=x_q(K-L)$ (periodicity) to sample $x_q(-1)=x_q(K-1)$ (periodicity).

Therefore, to adapt the proposed UF-OFDM approach to OFDM, the suffix part is no longer calculated from the prefix part, alternative filter coefficients for the core and Prefix parts are applied as specified above, and the concatenator concatenates the outputs of the prefix and core parts only.

Alternatively, the proposed UF-OFDM approach can be adapted to OFDM by applying alternative filter coefficients for the core part, and by adapting the transient-state processor (prefix part) to copy the last L samples of the core part. The suffix part need no longer calculated from the prefix part, and the concatenator concatenates the outputs of the prefix and core parts only.

As such, the structure defined with respect to FIGS. 3, 5 and 6 for example is capable of processing both UF-OFDM and OFDM signals.

Similar modifications can extend compatibility to further multicarrier waveform based encoding such as Generalized Frequency Division Multiplexing (GFDM), Filter Bank Multi-Carrier (FBMC) and the like.

While the preceding embodiments have been described in terms of encoder device components, other embodiments take the form of method steps.

FIG. 8 shows a method in accordance with an embodiment.

As shown in FIG. 8, there is provided a method of encoding UF-OFDM signals. As shown, the method starts at step 800 before proceeding to step 810 at which a series of input symbols are segmented in a sequence of respective segments, each segment comprising the symbols corresponding in number to the number of input symbols being assigned to each sub-band for a given sub-carrier index.

The method next proceeds to step 820, at which the first plurality of symbols is processed to obtain a corresponding number of processed samples.

At step 825 it is determined whether all of the segments required to process the corresponding set of sub-carriers have been processed. If segments remain to be processed the method loops back to step 820 for the next segment, or otherwise proceeds to step 830, of sorting the samples in a predetermined sequence, where the number of samples is equal in number to the number of input symbols being assigned to each sub-carrier.

This sorting step may comprise the interlacing described above. The method then proceeds to step 840 of processing the samples to obtain a UF-OFDM data stream before terminating at step 850.

Specifically, the step 810 of segmenting may comprise:

1. Segmenting the input symbols c(i) into K sub-bands of Q sub-carriers. This step segments the input symbols, composed of N symbols, into K sub-bands of Q sub-carriers as follows:

$$s_k(q)=c(q+kQ)$$

$s_k(q)$ represents the input symbol affected to the sub-carrier number q of the sub-band number k. It may be noted that the input symbols c(i) do not only carry QAM symbols to transmit. In practice, only a subset B of the K sub-bands will be allocated (B≤K). In this case, the c(i) symbols must appended with zeros valued samples, so that a total of N input symbols are defined (composed of both QAM symbols and zeros valued symbols). These zeros are thus grouped together in particular sub-bands (those which are not affected by the input symbols carrying the QAM symbols to transmit).

A proposed segmentation rule can be described as follows:

For the Q sub-carriers of the first sub-band (k=0), take the first Q c(i) (i=0 to Q−1) input samples.

For the Q sub-carriers of the second sub-band (k=1), take the next Q c(i) input symbols (i=Q to 2Q−1).

( . . . )

Repeats until the last sub-band is reached (k=K−1).

The step 820 of processing each first plurality of symbols may comprise:

2. Computing the IFFT of size K of $S_k$(q) for each sub-carrier:

$$x_q(n) = \sum_{k=0}^{K-1} s_k(q)e^{j2\pi \frac{k}{K}n}$$

This process may be performed iteratively as, with the results of each iteration being retained until the complete set of K*Q=N samples are computed:

In a first iteration, The IFFT (of size K) computes the first sub-carrier of each of the K sub-bands. The result of the IFFT gives K samples which must be stored.

In a second iteration, The IFFT (of size K) processes the second sub-carrier of each of the K sub-bands. The result of the IFFT gives K samples which must be stored.

This is repeated until the Qth iteration. In total, N=K*Q samples are stored.

Alternatively, a wholly or partially parallel implementation may be envisaged which would do away with the need for storage of the computed values and accelerate processing and the cost of increased system complexity and size.

FIG. 9 shows further detail of the method of FIG. 8 in accordance with certain embodiments.

FIG. 9 shows additional detail of the step 840, whereby the step 840 of processing each second plurality of samples to obtain a UF-OFDM data stream may comprise a step 841 of processing for the two extremity parts of the base band signal corresponding to the transient state of the UF-OFDM data stream and a step 842 of processing for a core part of the base band signal corresponding to the non-transient state of the UF-OFDM data stream separately; and furthermore comprise a step 843 of concatenating the two processed extremity parts of the base band signal corresponding to the transient state of the UF-OFDM data stream and the processed core part of the base band signal corresponding to the non-transient state of the UF-OFDM data stream to obtain a UF-OFDM data stream.

The step 841 of processing the core part corresponding to the non-transient state of the UF-OFDM data stream may comprise:

3. Multiplying $x_q(n')$ by the core filter coefficients $$F_q(n') = e^{j2\pi \frac{q}{N} n'} \sum_{l=0}^{L-1} f_Q(l) e^{-j2\pi \frac{q}{N} l}$$

$$z_q(n') = F_q(n') x_q(n')$$

These coefficients correspond to applying an FFT of size N of the frequency shifted UF-OFDM filter $f_Q(l)$. From the result of this FFT, only the first Q coefficients are useful (since $q \in [0, Q-1]$). Then, a linear phase rotation is applied (the term $$e^{j2\pi \frac{q}{N} n'}).$$

4. Computing the IFFT of size Q of $y_q(n)$ for each sample $n' \in [0, K-1]$ and storing results $$y_p(n') = \sum_{q=0}^{Q-1} z_q(n') e^{j2\pi \frac{q}{Q} p}$$

This step calculates the core part of the baseband samples. The result of this step gives Q segments of K samples. $y_q(n')$ is the sample number n of the segment number p.

5. Combine the resulting segmented samples $y_q(n')$ to form the core part of the baseband samples and store the results.

The relation between the core part of the baseband samples (composed of N samples) and the segmented samples is expressed as follows:

$$y_{core}(n) = y_{\lfloor \frac{n}{K} \rfloor}(\text{mod}_k(n))(n \in [0, N-1])$$

This step constitutes sorting the segmented samples output by the IFFT at step 4 so as to output the values to the next step in a predetermined sequence. In certain embodiments, this sequence may correspond to outputting the values corresponding to each sub-band in turn, with the values corresponding to that sub-band being output sequentially before proceeding to output the values for the next sub-band.

The step 842 of processing the parts of the baseband signal corresponding to the transient state of the UF-OFDM data stream may comprise:

6. Calculate the prefix samples with the prefix filter tail coefficients and storing results $$P_q(n_p) = e^{j2\pi \frac{q}{N} n_p} \sum_{l=0}^{n} f_Q(l) e^{-j2\pi \frac{q}{N} l}$$

$$y_{prefix}(n_p) = \sum_{q=0}^{Q-1} P_q(n_p) x_q(n_p)$$

The number of the prefix tail coefficients is fixed by the UF-OFDM filter length and the number of sub-carriers in a sub-band Q. The length of the filter is a design parameter. The total number of prefix tail coefficients $P_q(n_q)$ is equal to L×Q.

The accumulator is the summation operation (from 0 to Q−1) in the second equation. The delay is fixed to one sample.

FIG. 10 shows further detail of the method of FIG. 9 in accordance with certain embodiments.

FIG. 10 shows additional detail of the step 842 of processing for the two extremity parts of the base band signal corresponding to the transient state of the UF-OFDM data stream comprises processing a first the extremity part of the baseband signal, and wherein the step 842 of processing the each second plurality of samples to obtain a UF-OFDM data stream comprises an additional step 8421 of either subtracting samples corresponding to the core part of the base band signal from samples corresponding to the first extremity part of the baseband signal, or adding samples corresponding to the core part of the base band signal from samples corresponding to the first extremity part of the baseband signal, to obtain samples corresponding to the second extremity part of the baseband signal.

Accordingly, the step 8421 of obtaining the second extremity part may comprise:

7. Calculating the suffix samples of the baseband signal $$y_{suffix}(n_s) = y_{\lfloor \frac{n}{K} \rfloor}(\text{mod}_k(n_s)) - y_{prefix}(n_s)$$

where $\lfloor x \rfloor$ corresponds to the floor operator (largest integer less than or equal to x)

At this stage, there are L samples to choose from, since this equation corresponds to the suffix part of the baseband signal (transient state of the signal).

It may be noted that it is equally possible to calculate the prefix part of the signal from the suffix part. The only difference is that different filter tail coefficients will be required for the initial calculation of the suffix part, instead of the prefix part, in the preceding step.

8. Concatenating the suffix, core and prefix samples to deduce the full baseband signal $$y(n) = \begin{cases} y_{prefix}(n), & n \in [0, L-1] \\ y_{\lfloor \frac{L+n}{K} \rfloor}(\text{mod}_k(L+n)), & n \in [L, N-1] \\ y_{suffix}(n), & n \in [N, N+L-2] \end{cases}$$

Figure 11:
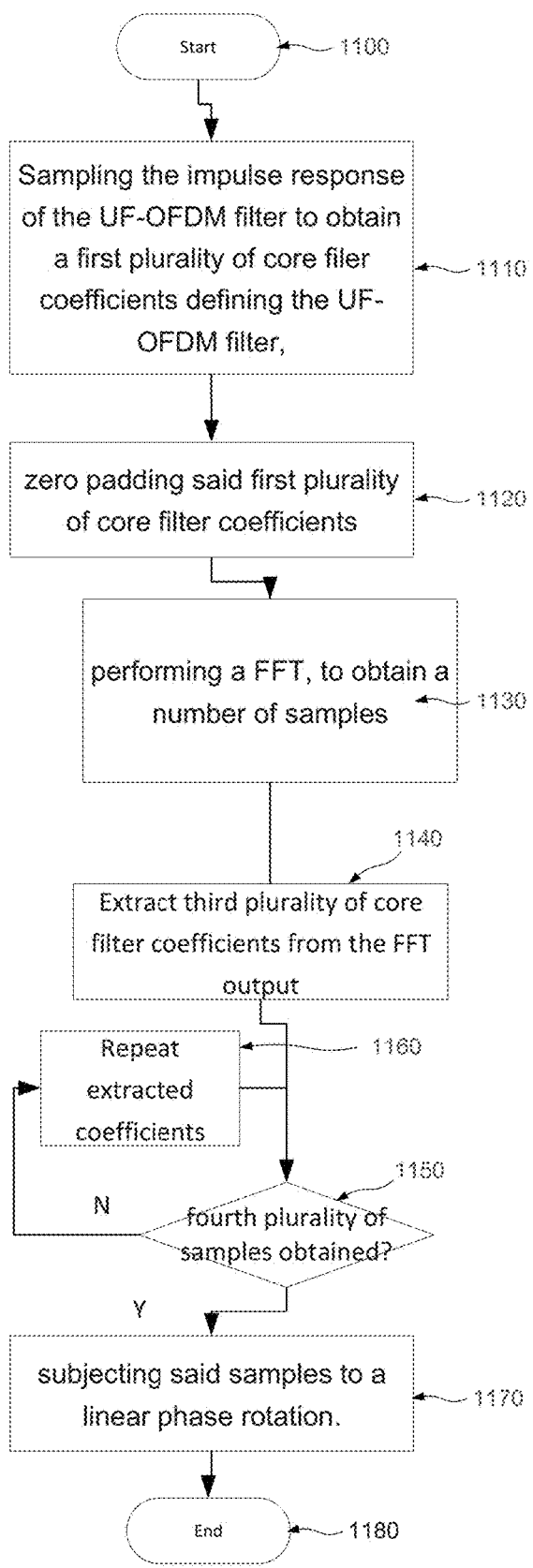
FIG. 11 shows the steps of a method of defining a set of filter coefficients for use as a first set of filter coefficients in accordance with certain embodiments.

FIG. 11 shows the steps of a method of defining a set of filter coefficients for use as a first set of filter coefficients in accordance with certain embodiments.

As described above, the first set of filter coefficients is the set of values used in the first filter e.g. 6311/6312, provided in the sub-carrier core processor, and used for processing the sub-band core value not corresponding to a transient state e.g. at step 421 of the method of FIG. 9.

As shown in FIG. 11, the method starts at step 1100 before proceeding to step 1110 at which the frequency shifted UF-OFDM filter (that is, whatever function $f_Q(l)$ is adopted as discussed above) is sampled to obtain a plurality of core filter coefficients. In many cases the frequency shifted UF-OFDM filter (fq(l)) is already sampled with Lcore filter coefficients.

The method next proceeds to step 1120 at which the core filter coefficients are zero padded to obtain a set of padded core filter coefficients, where this set of padded core filter coefficients comprises a number of coefficients equal to a K: the number of input symbols being assigned to each sub-band for a given sub-carrier index multiplied by Q, the number of input symbols being assigned to each sub-carrier for a given sub-band index, that is, N.

The method next proceeds to a step 1130 of performing a FFT of size equal to the total number of sub-carriers across all the sub-bands on the set of padded core filter coefficients, to obtain a number of samples equal to K: input symbols being assigned to each sub-band for a given sub-carrier index multiplied by Q, the number of input symbols being assigned to each sub-carrier for a given sub-band index.

The method next proceeds to a step 1140 of extracting the Q first samples of the FFT obtained at step 1130, and then determines at step 1150 whether the necessary number of samples equal to N, is obtained. If the necessary number of samples has not yet been obtained the method loops back to step 1160 at which the extracted values are repeated once more, or otherwise proceeds to step 1170.

Accordingly the extracted samples are extracted, and repeated/duplicated as many times as necessary to obtain total number of sub-carriers across all the sub-bands N core filter coefficients are obtained.

Finally the set of samples is subjected a linear phase rotation at step 1170 before the method terminates at step 1180.

As described above, the second set of filter coefficients is the set of values used in the second filter e.g. 6311/6312, provided in the sub-carrier transient state processor 631, and used for processing the sub-band extremity values corresponding to a transient state e.g. at step 422 of the method of FIG. 9.

Figure 12:
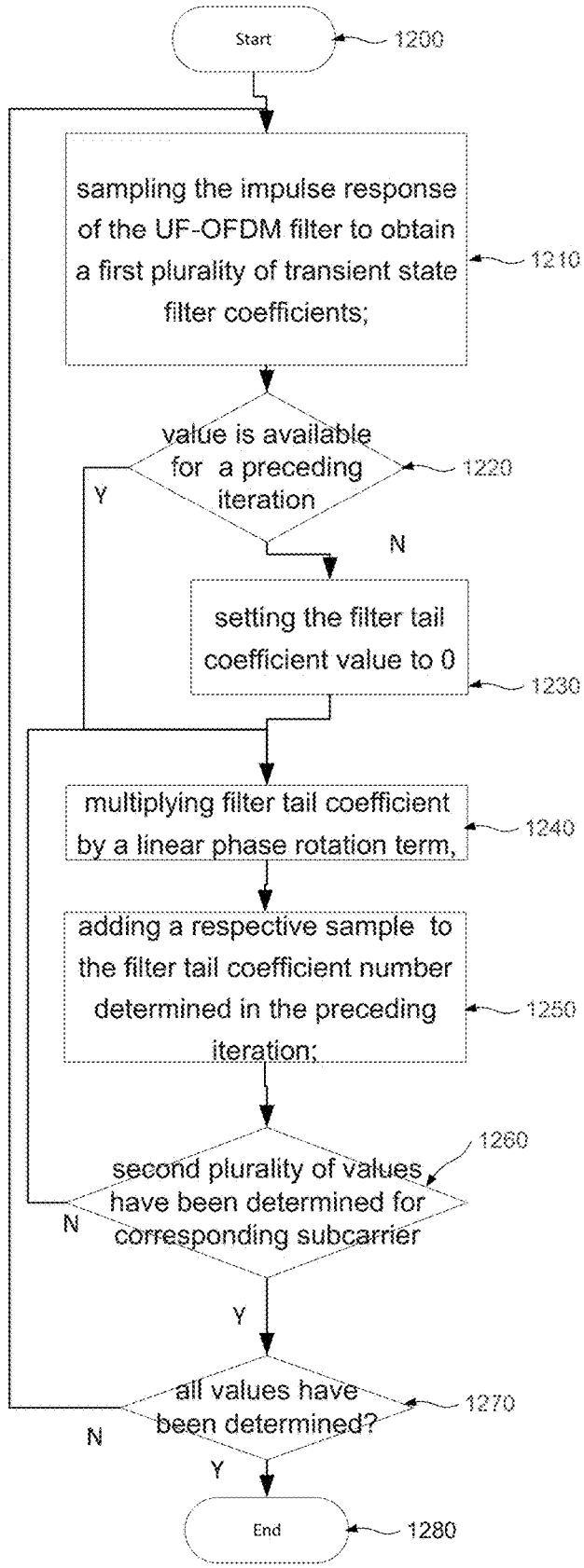
FIG. 12 shows the steps of a method of defining a set of filter coefficients for use as a second set of filter coefficients in accordance with certain embodiments.

FIG. 12 shows the steps of a method of defining a set of filter coefficients for use as a second set of filter coefficients in accordance with certain embodiments;

As shown in FIG. 12, the method starts at step 1200 before proceeding step 1210 at which the frequency shifted UF-OFDM filter (that is, whatever function $f_Q(l)$ is adopted as discussed above) is sampled to obtain a first plurality of filter tail coefficients. The method next proceeds to step 1220, at which it is determined whether a filter tail coefficient is available from a previous iteration (in other words, determining whether this is the first iteration or not). In a case where no value is available, the method proceeds to step 1230 at which the filter tail coefficient value is set to 0 before proceeding to step 1250. If it is determined at step 1220 that a previous filter tail coefficient value is available, the method proceeds to step 1240 at which the filter tail coefficient determined in the preceding iteration is multiplied by a linear phase rotation term $$e^{j2\pi \frac{q}{N}}.$$

From step 1240 the method proceeds to step 1250 at which the coefficient generated at step 1240 is added to the previous filter tail coefficient value to obtain a new filter tail coefficient, before proceeding to step 1260. At the end of each iteration, the calculated value corresponds to a filter tail coefficient, which must be set aside as a coefficient.

At step 1260, it is determined whether all values required to compile the required set of values have been computed, and if the process is complete the method proceeds to step 1270 or otherwise loops back to step 1240 for the next iteration.

At step 1270, it is determined whether all values have been computed, and if the process is complete, the method terminates at step 1280, or otherwise loops back to step 1210 for next iteration.

An implementation based on the embodiment of FIG. 6 may be evaluated for overhead in comparison to the reference OFDM implementation as follows:

| Sub-band size | $C_{RM}$ for OFDM | $C_{RM}$ for embodiment | Overhead |
| --- | --- | --- | --- |
| 4 | 77832 | 80168 | x1.03 |
| 8 | 77832 | 80456 | x1.03 |
| 16 | 77832 | 84104 | x1.08 |
| 32 | 77832 | 92936 | x1.19 |
| 64 | 77832 | 111368 | x1.43 |

The resulting computational complexity is less than 1.5 times that of OFDM.

According to certain embodiments there is provided an encoder architecture for UF-OFDM, in which samples are first processed sub-band wise, and then re-sorted for sub-carrier-wise processing. The sub-carrier processing may comprise separate processing for the two extremity parts of the base band signal corresponding to the transient state of the UF-OFDM data stream and for a core part of the base band signal corresponding to the non-transient state of the UF-OFDM data stream, and then concatenation to obtain a UF-OFDM data stream. In certain embodiments a first extremity part of the base band signal corresponding to the transient state of the UF-OFDM data steam is calculated directly, and the other extremity part inferred from the core part and the first extremity part. The core and extremity part processors may be implemented with filters adapted to multiply each sample by a respective filter coefficient. Modifying these coefficients can introduce a frequency shift or convert the encoder for OFDM encoding.

The disclosed methods can take form of an entirely hardware embodiment (e.g. FPGAs, ASICs), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, acoustic, electroacoustic, or semiconductor system (or apparatus or device) or a propagation medium.

These methods and processes may be implemented by means of computer-application programs or services, an application-programming interface (API), a library, and/or other computer-program product, or any combination of such entities.

Figure 13:
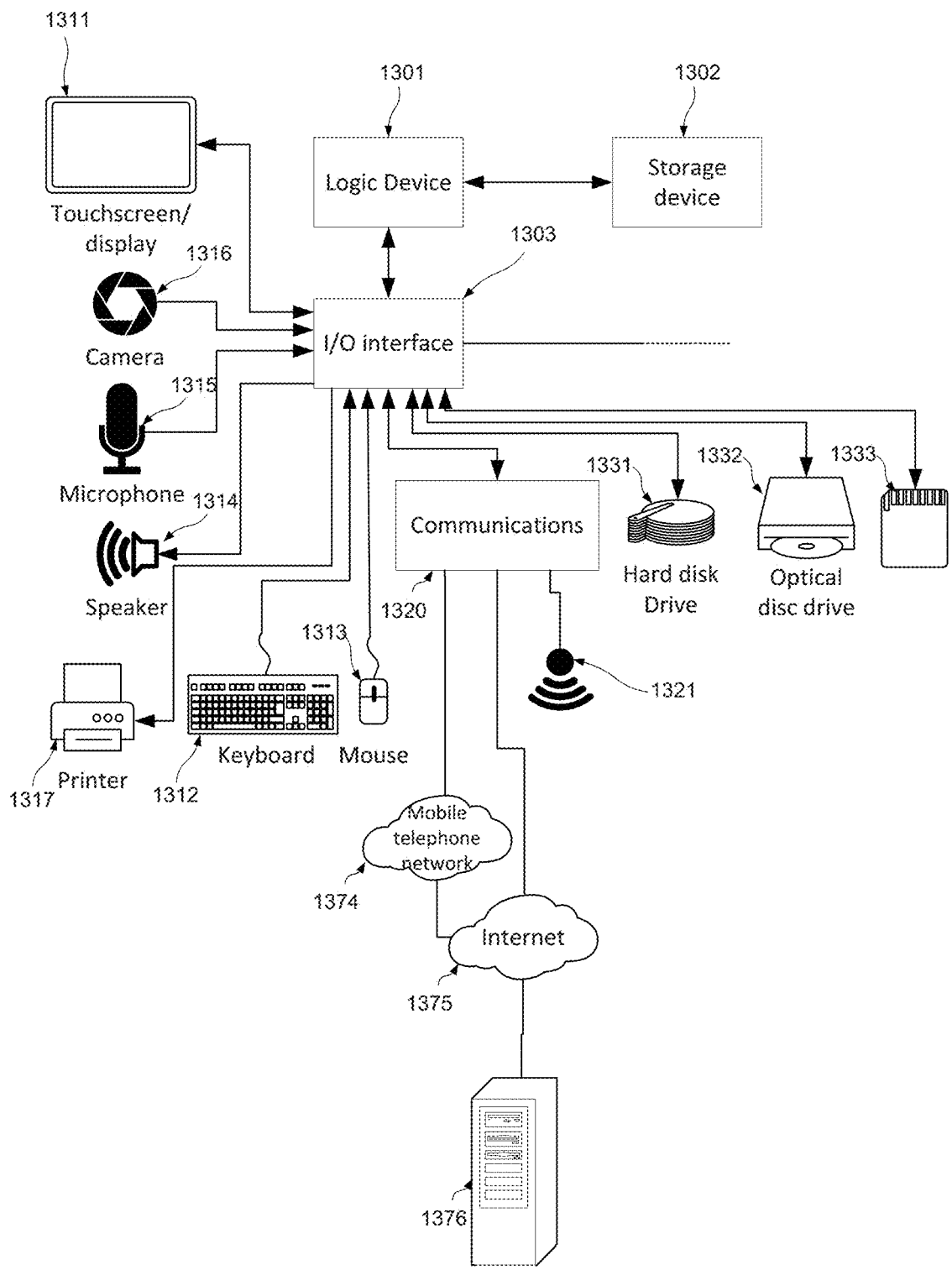
FIG. 13 shows a generic computing system suitable for implementation of embodiments of the invention.

FIG. 13 shows a generic computing system suitable for implementation of embodiments of the invention.

As shown in FIG. 13, a system includes a logic device 1301 and a storage device 1302. The system may optionally include a display subsystem 1311, input/output subsystem 1303, communication subsystem 1320, and/or other components not shown.

Logic device 1301 includes one or more physical devices configured to execute instructions. For example, the logic device 1301 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 1301 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 1301 optionally may be distributed among two or more separate devices, which may be remotely located and/or configured for coordinated processing. Aspects of the logic device 1301 may be virtualized and executed by remotely accessible, networked computing devices configured in a cloud-computing configuration.

Storage device 1302 includes one or more physical devices configured to hold instructions executable by the logic device to implement the methods and processes described herein. When such methods and processes are implemented, the state of storage 1302 device may be transformed—e.g., to hold different data.

Storage device 1302 may include removable and/or built-in devices. Storage device 1302 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an I/O interface 1303 adapted to support communications between the Logic device 1301 and further system components. For example, additional system components may comprise removable and/or built-in extended storage devices. Extended storage devices may comprise one or more types of storage device including optical memory 1332 (e.g., CD, DVD, HD-DVD, Blu-Ray Disc, etc.), semiconductor memory 1333 (e.g., FLASH RAM, EPROM, EEPROM, FLASH etc.), and/or magnetic memory 1331 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 1301 and storage device 1302 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 13 may be used to implement embodiments of the invention.

For example a program implementing the steps described with respect to FIG. 8, 9, 10, 11 or 12 may be stored in storage device 1302 and executed by logic device 1301. The coefficients used in the first or second filters, may be buffered in the storage device 902. Similarly, the samples output by the IFFT 521 may be stored in storage device 902, and the sorting operation of step 830 performed thereon. The accumulation function of the summation unit 6313 or otherwise may be implemented by means of this storage, as may the storage of the output of the sub-carrier core processor and the output of the transient state processor prior to processing in the arithmetic unit 634. The Logic device 901 may implement the steps as described above under the control of a suitable program, in particular the filtering operations, FFT, or IFFT operations, addition or subtraction or concatenation operations described above, or may interface with internal or external dedicated systems adapted to perform some or all of these processes such as hardware accelerated encoders/decoders and the like. Furthermore, a program may implement an encoder implementing encoding accordance with embodiments for example as described above. These tasks may be shared among a number of computing devices, for example as described with reference to FIG. 9. The encoded signal may be received via the communications interface 920.

Accordingly the invention may be embodied in the form of a computer program.

It will be appreciated that a "service", as used herein, is an application program executable across multiple user sessions. A service may be available to one or more system components, programs, and/or other services. In some implementations, a service may run on one or more server-computing devices.

When included, display subsystem 1311 may be used to present a visual representation of the samples at different points in the system, or may otherwise present statistical information concerning the processes undertaken. As the herein described methods and processes change the data held by the storage device 1302, and thus transform the state of the storage device 1302, the state of display subsystem 1311 may likewise be transformed to visually represent changes in the underlying data. Display subsystem 1311 may include one or more display devices utilizing virtually any type of technology. Such display devices may be combined with logic device and/or storage device in a shared enclosure, or such display devices may be peripheral display devices.

When included, input subsystem may comprise or interface with one or more user-input devices such as a keyboard 1312, mouse 1313, touch screen 1311, printer 1317, camera 1316 or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1320 may be configured to communicatively couple computing system with one or more other computing devices. For example, communication module of may communicatively couple computing device to remote service hosted for example on a remote server 1376 via a network of any size including for example a personal area network, local area network, wide area network, or the internet. Communication subsystem may include wired and/or wireless communication devices compatible with one or more different communication protocols. As non-limiting examples, the communication subsystem may be configured for communication via a wireless telephone network 1374, or a wired or wireless local- or wide-area network. In some embodiments, the communication subsystem may allow computing system to send and/or receive messages to and/or from other devices via a network such as the Internet 1375. The communications subsystem may additionally support short range inductive communications 1321 with passive devices (NFC, RFID etc).

Figure 14:
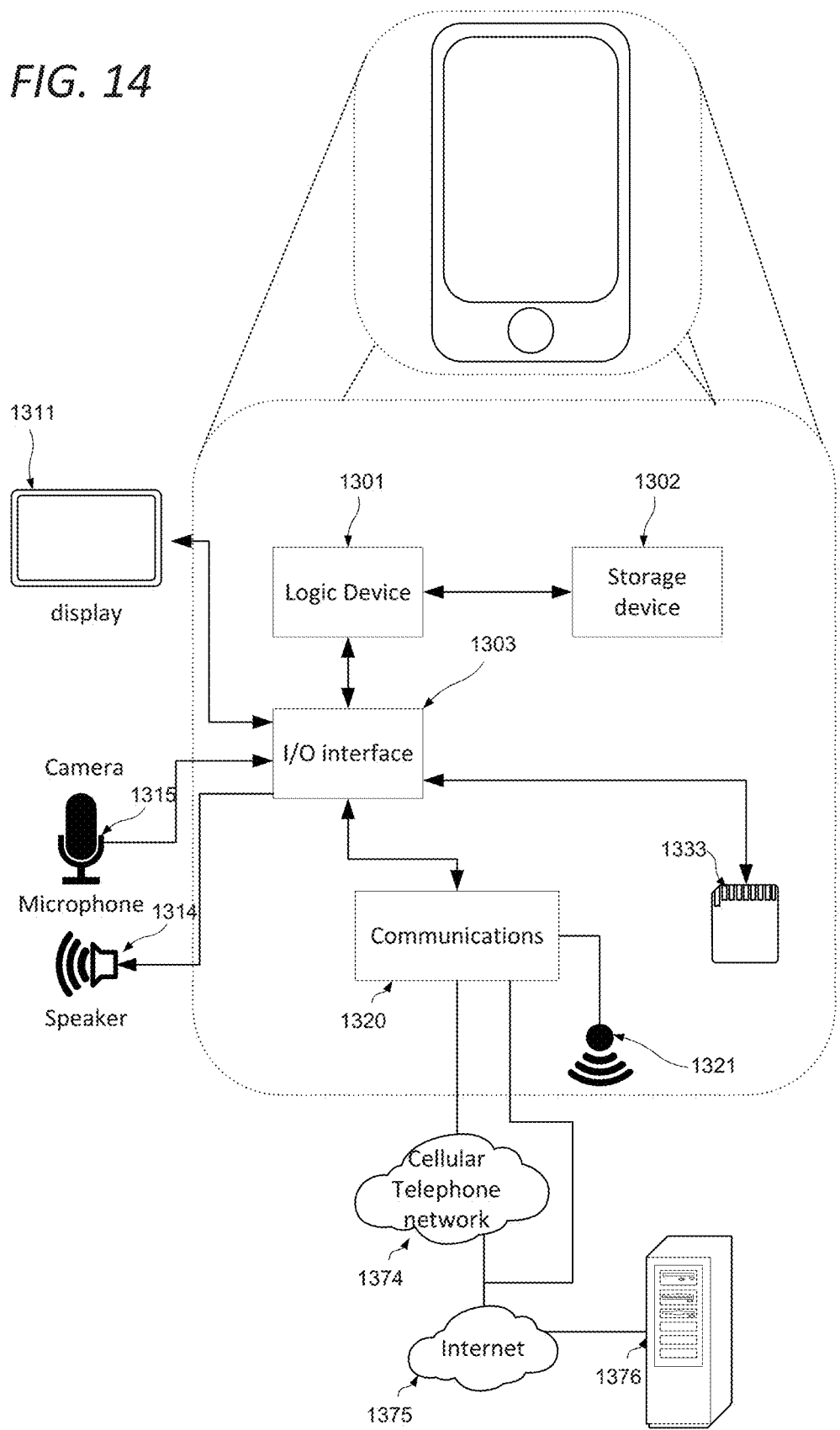
FIG. 14 shows a smartphone device adaptable to constitute an embodiment.

FIG. 14 shows a smartphone device adaptable to constitute an embodiment. As shown in FIG. 14, the smartphone device incorporates elements 1301, 1302, 1303, 1320, near field communications interface 1321, flash memory 1333, elements 1314, 1315, and 1311 as described above. It is in communication with the telephone network 1374 and a server 1376 via the network 1375. Alternative communication mechanisms such as a dedicated network wired or wireless (WiFi) may also be used.

Figure 15:
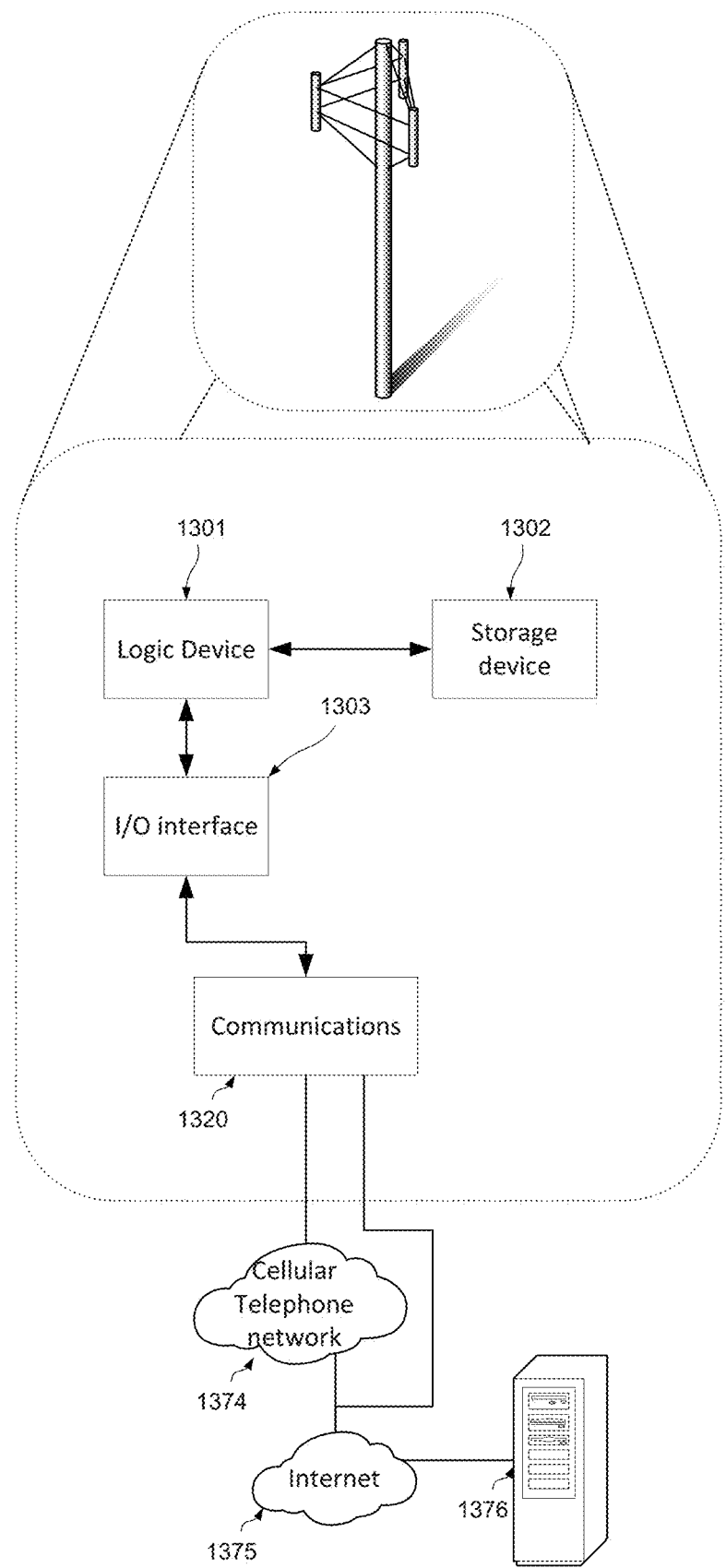
FIG. 15 shows a cellular network base station adaptable to constitute an embodiment.

FIG. 15 shows a cellular network base station adaptable to constitute an embodiment. As shown in FIG. 15, the cellular network base station incorporates elements 1301, 1302, 1303, and 1320 as described above. It is in communication with the telephone network 1374 and a server 1376 via the network 1375. Alternative communication mechanisms such as a dedicated network or WiFi may also be used.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An encoder for performing multicarrier waveform based encoding on a series of input symbols, said encoder comprising:
a segmentor adapted to output said input symbols in a sequence of respective segments each segment of said sequence of respective segments comprising a first plurality of symbols, said first plurality of symbols corresponding in number to the number of said input symbols being assigned to each sub-band for a given sub-carrier index;
a sub-band processor adapted to process each said first plurality of symbols to obtain a first plurality of samples, said sub-band processor being further adapted to output said first plurality of samples in a predetermined sequence of respective processed segments, wherein each processed segment of the respective processed segments comprises a second plurality of samples corresponding in number to the number of the series of input symbols being assigned to each sub-carrier for a given sub-band index so as to interleave the processed outputs for each sub-band across the different sub-carriers; and
a sub-carrier processor adapted to process each said second plurality of samples to obtain an encoded output data stream.

2. The encoder of claim 1 wherein said segmentor is adapted to output said input symbols in a sequence of respective segments, wherein in a case where said input symbols are insufficient to fully populate all said segments, adding zeros to fully define segments.

3. The encoder of claim 1 wherein said sub-band processor is adapted to perform an Inverse Fast Fourier Transform on each said segment output by said segmentor to provide said first plurality of samples.

4. The encoder of claim 1, wherein said encoded data stream is a UF-OFDM data stream, and said sub-carrier processor is characterized by being adapted to perform processing for the two extremity parts of the base band signal corresponding to the transient state of the UF-OFDM data stream and for a core part of the base band signal corresponding to the non-transient state of the UF-OFDM data stream separately, and further comprising a concatenator being adapted to concatenate the two processed extremity parts of the base band signal corresponding to the transient state of the UF-OFDM data stream and the processed core part of the base band signal corresponding to the non-transient state of the UF-OFDM data stream to obtain said UF-OFDM data stream.

5. The encoder of claim 4 wherein said encoder comprises a sub-carrier core processor configured to process samples corresponding to said core part of the base band signal and a transient state processor configured to process a first one of the two extremity parts of the baseband signal, and wherein said encoder further comprises an arithmetic unit configured to:
either subtract samples corresponding to said first extremity part of said baseband signal from samples corresponding to said core part of the baseband signal, or add samples corresponding to said first extremity part of said baseband signal to samples corresponding to said core part of the base band signal; and to obtain samples corresponding to a second one of the two extremity parts of the baseband signal;

and wherein said concatenator is adapted to concatenate the outputs of said transient state processor, said sub-carrier core processor, and said subtractor or said adder to obtain said UF-OFDM data stream.

6. The encoder of claim 5 wherein said sub-carrier core processor comprises a first filter adapted to multiply each said sample by a respective filter coefficient from a first set of filter coefficients, said first set of filter coefficients being defined by an Fast Fourier Transform of a size corresponding in number to the total number of sub-carriers across the sub-bands performed on the impulse response of the frequency shifted UF-OFDM filter and subjected to a linear phase rotation, and further comprising an Inverse Fast Fourier Transform block performing an Inverse Fast Fourier transform on the output of said first filter, said sub-carrier core processor being further adapted to sort the output of said Fast Fourier transform block to output the values determined by said Inverse Fast Fourier Transform block in a predetermined sequence, and wherein said transient state processor comprises a second filter implementing a second function adapted to multiply each said sample by a respective filter coefficient from a second set of filter coefficients, and a summation unit adapted to sum each value output by said second filter for a respective processed segment.

7. The encoder of claim 6 wherein said first set of filter coefficients corresponds to a first plurality of coefficients extracted from the first output of an Fast Fourier Transform performed on the frequency shifted UF-OFDM filter, said first plurality of coefficients being equal in number to the number of said input symbols being assigned to each sub-carrier for a given sub-band index, and said Fast Fourier Transform being of a size corresponding in number to the total number of sub-carriers across the sub-bands, said extracted coefficients being repeated a number of times equal to the number of said input symbols being assigned to each sub-band for a given sub-carrier index, to obtain a second plurality of coefficients equal to in number to the total number of sub-carriers across the sub-bands, said second plurality of coefficients being further subjected to a linear phase rotation term having an angle proportional to an index value of the respective sub-carrier.

8. The encoder of claim 6 wherein said first extremity part is a prefix part of the baseband signal, said second set of filter coefficients correspond to values obtained by calculating, for each sub-carrier, a third plurality of coefficients, said third plurality of coefficients being recursively calculated by multiplying the previously computed filter coefficient number by a linear phase rotation term having an angle proportional to an index value of the respective sub-carrier and by subtracting these multiplied coefficients by the successive sample number of the impulse response of the frequency shifted UF-OFDM filter, and said second sub-band part is a suffix part of the baseband signal, and said arithmetic unit is adapted to subtract samples corresponding to said first extremity part of said baseband signal from samples corresponding to said core part of the baseband signal to obtain samples corresponding to said second extremity part of the baseband signal.

9. The encoder of claim 6 wherein said first extremity part is a suffix part of the baseband signal;

said second set of filter coefficients correspond to values obtained by calculating, for each sub-carrier, a third plurality of coefficients, said third plurality of coefficients being recursively calculated by multiplying the previously computed filter coefficient number by a linear phase rotation term having an angle proportional to an index value of the respective sub-carrier, and by subtracting these multiplied coefficients by the successive coefficient number of frequency shifted UF-OFDM filter; and said second sub-band part is a prefix part of the baseband signal, and said arithmetic unit is adapted to add samples corresponding to said first extremity part of said baseband signal from samples corresponding to said core part of the base band signal to obtain samples corresponding to said second extremity part of the baseband signal.

10. The encoder of claim 6 wherein said summation unit comprises a storage device configured to accumulate the output of said summation unit, and wherein said summation unit is configured to add the value of each successive output of said second filter to the value stored in said storage device and store the result in said storage device until the value in said storage device incorporates the sum of each value output by said second filter for a respective processed segment.

11. The encoder of claim 6, wherein said first set of coefficients and said second set of coefficients further reflect a linear phase rotation so as to introduce a frequency shift to said UF-OFDM data stream, and wherein a circular shift unit is provided before said Inverse Fast Fourier Transform unit of the sub-carrier core processor.

12. A method of encoding UF-OFDM signals, said method comprising:

segmenting a series of input symbols in a sequence of respective segments each segment of said sequence of respective segments comprising a first plurality of symbols, said first plurality of symbols corresponding in number to the number of said input symbols being assigned to each sub-band;

processing each said first plurality of symbols to obtain a corresponding first plurality of samples, sorting said first plurality of samples in a predetermined sequence of respective processed segments, wherein each processed segment of the respective processed segments comprises a second plurality of samples corresponding in number to the number of the series of the input symbols being assigned to each sub-carrier so as to interleave the processed outputs for each sub-band across the sub-carriers; and processing each said second plurality of samples to obtain a UF-OFDM data stream.

13. The method of claim 12, wherein said processing each said second plurality of samples to obtain a UF-OFDM data stream comprises:

processing for a first extremity part and a second extremity part of the base band signal corresponding to the transient states of the UF-OFDM data stream and processing for a core part of the base band signal corresponding to the non-transient state of the UF-OFDM data stream separately; and concatenating the two processed extremity parts of the base band signal corresponding to the transient state of the UF-OFDM data stream and the processed core part of the base band signal corresponding to the non-transient state of the UF-OFDM data stream to obtain a UF-OFDM data stream.

14. The method of claim 12 wherein said processing for the first extremity part and the second extremity part of the base band signal corresponding to the transient state of the UF-OFDM data stream comprises processing the first extremity part of the baseband signal, and wherein said processing each said second plurality of samples to obtain a UF-OFDM data stream further comprises either subtracting samples corresponding to said first extremity part of said baseband signal from samples corresponding to said core part of the base band signal, or adding samples corresponding to said first extremity part of said baseband signal to samples corresponding to said core part of the base band signal, to obtain samples corresponding to said second extremity part of the baseband signal.

15. A method of defining a set of filter coefficients, comprising:
- sampling a frequency shifted UF-OFDM filter to obtain a first plurality of core filter coefficients,
- zero padding said first plurality of core filter coefficients to obtain a set of padded core filter coefficients, said set of padded core filter coefficients comprising a number of coefficients equal to a total number of sub-carriers across sub-bands,
- performing a Fast Fourier Transform of size equal to a total number of sub-carriers across the sub-bands, to obtain a second plurality of core filter coefficients being equal in number to the total number of sub-carriers across the sub-bands,
- extracting a third plurality of core filter coefficients from first outputs of the Fast Fourier Transform performed in the preceding step, said third plurality of core filter coefficients being equal in number to a number of input symbols being assigned to each sub-carrier for a given sub-band index,
- repeating said extracted core filter coefficients until a fourth plurality of core filter coefficients equal in number to the total number of sub-carriers across the sub-bands is obtained, and
- subjecting said fourth plurality of core filter coefficients to a linear phase rotation.

16. A method of defining a set of filter coefficients, comprising:
- sampling a frequency shifted UF-OFDM filter to obtain a first plurality of filter tail coefficients;
- in a case where no value is available for a preceding iteration, setting an iterated coefficient value to 0, or otherwise
- in a case where a value is available for a preceding iteration, multiplying a cumulative iterated coefficient value by a linear phase rotation term;
- adding a respective coefficient from first plurality of filter tail coefficient to the iterated coefficient number determined in the preceding iteration to obtain a cumulative iterated coefficient value;
- repeating for each successive iterated coefficient until a second plurality of filter tail coefficients have been determined, said second plurality of filter tail coefficients being equal in number to the number of coefficients defining the UF-OFDM filter repeating for each sub-carrier until all values have been determined.

17. A computer program stored in a non-transitory computer storage medium comprising computing instructions when executed by at least one processor perform the method of claim 12.

* * * * *